US010702099B2

(12) United States Patent
O'Shaughnessy et al.

(10) Patent No.: US 10,702,099 B2
(45) Date of Patent: Jul. 7, 2020

(54) GRILL AND SIDE CART ATTACHMENT SYSTEMS AND METHODS

(71) Applicant: OHC IP Holdings, LLC, Eden Prairie, MN (US)

(72) Inventors: Michael L. O'Shaughnessy, Edina, MN (US); James A. Mitlyng, Minneapolis, MN (US); Thomas E. Mckinney, Minnetonka, MN (US)

(73) Assignee: OHC IP Holdings, LLC, Eden Prairie, MN (US)

( * ) Notice: Subject to any disclaimer, the term of this patent is extended or adjusted under 35 U.S.C. 154(b) by 0 days.

(21) Appl. No.: 16/450,303

(22) Filed: Jun. 24, 2019

(65) Prior Publication Data
US 2020/0000277 A1 Jan. 2, 2020

Related U.S. Application Data

(60) Provisional application No. 62/690,700, filed on Jun. 27, 2018.

(51) Int. Cl.
*A47J 37/07* (2006.01)
*B23P 19/02* (2006.01)
*B23P 19/12* (2006.01)

(52) U.S. Cl.
CPC ....... *A47J 37/0713* (2013.01); *A47J 37/0786* (2013.01); *B23P 19/02* (2013.01); *B23P 19/12* (2013.01); *A47J 2037/0777* (2013.01)

(58) Field of Classification Search
CPC .............. A47J 37/07; A47J 2037/0777; A47J 37/0763; A47J 37/0704; A47J 37/0713; A47J 37/0786

(Continued)

(56) References Cited

U.S. PATENT DOCUMENTS 3,802,413 A 4/1974 Pepin
4,211,206 A 7/1980 Darbo
(Continued)

FOREIGN PATENT DOCUMENTS

CN 201005546 1/2008
CN 202801180 3/2013
(Continued)

OTHER PUBLICATIONS https://www.sunco.com.au/shop/bbqs/sc100-xspec-four-burner-outdoor-kitchen/ (Year: 2018).*
(Continued)

*Primary Examiner* — Vivek K Shirsat
*Assistant Examiner* — Ko-Wei Lin
(74) *Attorney, Agent, or Firm* — Pauly, DeVries Smith & Deffner LLC

(57) ABSTRACT

Embodiments herein relate to grill systems. In an embodiment, a grill system is included. The grill system having a grill assembly and a first side assembly. The grill assembly can include a grill cart and a burner box configured to couple to a top portion of the grill cart. The burner box can include a first connection structure. The first side assembly that can include a first side cart and a first top cap configured to couple to a top portion of the first side cart. The first top cap can include a second connection structure. The first connection structure and the second connection structure mate together to couple the grill assembly to the first side assembly. Other embodiments are also included herein.

22 Claims, 21 Drawing Sheets

(58) Field of Classification Search
USPC ........ 126/25 R, 9 R, 9 B, 41 R, 30, 50, 276;
312/111
See application file for complete search history.

(56) References Cited

U.S. PATENT DOCUMENTS

| | | |
|---|---|---|
| 4,569,327 A | 2/1986 | Velten |
| 4,577,772 A | 3/1986 | Bigliardi |
| 4,887,836 A | 12/1989 | Simjian |
| 4,949,701 A | 8/1990 | Krosp et al. |
| 4,984,515 A | 1/1991 | Pivonka |
| 5,040,809 A | 8/1991 | Yang |
| 5,050,731 A | 9/1991 | Baynes et al. |
| 5,065,734 A | 11/1991 | Elliott |
| 5,261,550 A | 11/1993 | Karpisek |
| 5,462,318 A | 10/1995 | Cooke |
| 5,884,554 A | 3/1999 | Sprick |
| 6,039,039 A | 3/2000 | Pina, Jr. |
| 6,316,837 B1 | 11/2001 | Song |
| 6,401,953 B2 | 6/2002 | Kofod |
| 6,439,111 B1 | 8/2002 | Lu |
| 6,439,220 B1 | 8/2002 | Johnson |
| 6,439,221 B1 | 8/2002 | Ward et al. |
| 6,494,419 B2 | 12/2002 | Pai |
| 6,532,951 B1 | 3/2003 | Sallie et al. |
| 6,606,986 B2 | 8/2003 | Holland et al. |
| 6,619,600 B1 | 9/2003 | Johnson et al. |
| 6,823,858 B1 | 11/2004 | Chen |
| 6,916,028 B2 | 7/2005 | Shapiro |
| 7,360,783 B2 | 4/2008 | Home |
| 7,753,047 B1 | 7/2010 | Trammell |
| 7,856,924 B1 | 12/2010 | Stihi |
| 8,042,829 B2 | 10/2011 | Hailston et al. |
| 8,316,837 B2 | 11/2012 | Malumyan |
| 8,602,017 B2 | 12/2013 | May et al. |
| 9,187,108 B2 | 11/2015 | Bruno et al. |
| 9,211,036 B2 | 12/2015 | May et al. |
| 9,392,904 B2 | 7/2016 | Garman |
| 9,817,108 B2 | 11/2017 | Kuo et al. |
| 2001/0015137 A1 | 8/2001 | Ogrady et al. |
| 2004/0020482 A1 | 2/2004 | Chen |
| 2004/0065313 A1 | 4/2004 | Thompson |
| 2006/0049725 A1 | 3/2006 | Simon |
| 2006/0225725 A1 | 10/2006 | Rinaldo |
| 2007/0089724 A1 | 4/2007 | Home |
| 2007/0152414 A1 | 7/2007 | Home |
| 2008/0245357 A1* | 10/2008 | Meether ............... A47J 37/0704 126/25 R |
| 2010/0031950 A1 | 2/2010 | Paslawski |
| 2010/0326938 A1 | 12/2010 | Zhu et al. |
| 2011/0025005 A1 | 2/2011 | Howell |
| 2011/0041831 A1 | 2/2011 | Dettloff |
| 2011/0168155 A1 | 7/2011 | Gallo |
| 2011/0168168 A1 | 7/2011 | Schneider |
| 2011/0168593 A1 | 7/2011 | Neufeld et al. |
| 2012/0017890 A1 | 1/2012 | May et al. |
| 2013/0049311 A1 | 2/2013 | Metters et al. |
| 2013/0112088 A1 | 5/2013 | May |
| 2014/0069412 A1 | 3/2014 | Garman |
| 2014/0165992 A1 | 6/2014 | May et al. |
| 2014/0261394 A1 | 9/2014 | Evans et al. |
| 2015/0013667 A1 | 1/2015 | Ho et al. |
| 2015/0020796 A1* | 1/2015 | Garman ............... A47J 37/0763 126/9 B |
| 2015/0118006 A1 | 4/2015 | Wallace-riley |
| 2016/0305172 A1 | 10/2016 | Grisendi |
| 2017/0085114 A1 | 3/2017 | Gao et al. |
| 2017/0095114 A1 | 4/2017 | O'shaughnessy et al. |
| 2017/0159941 A1 | 6/2017 | Kahler et al. |
| 2018/0141576 A1 | 5/2018 | Leffler et al. |
| 2018/0280677 A1 | 10/2018 | Knight |
| 2018/0290677 A1 | 10/2018 | Patton et al. |
| 2020/0000278 A1 | 1/2020 | O'shaughnessy et al. |
| 2020/0000279 A1 | 1/2020 | O'shaughnessy et al. |
| 2020/0000280 A1 | 1/2020 | O'shaughnessy et al. |
| 2020/0000281 A1 | 1/2020 | O'shaughnessy et al. |
| 2020/0000283 A1 | 1/2020 | O'shaughnessy et al. |

FOREIGN PATENT DOCUMENTS

| | | |
|---|---|---|
| CN | 205632566 | 10/2016 |
| CN | 107198467 | 9/2017 |
| JP | 2006223643 | 8/2006 |
| KR | 200173343 | 4/2000 |
| KR | 20050102437 | 10/2005 |
| KR | 20130000879 | 2/2013 |
| TW | 309958 | 7/1997 |
| WO | 2004054415 | 7/2004 |
| WO | 2004072539 | 8/2004 |
| WO | 2015089551 | 6/2015 |
| WO | 2016149408 | 11/2016 |
| WO | 2017095746 | 6/2017 |
| WO | 2017160338 | 9/2017 |
| WO | 2018183373 | 10/2018 |
| WO | 2020005946 | 1/2020 |
| WO | 2020005969 | 1/2020 |
| WO | 2020005972 | 1/2020 |
| WO | 2020005976 | 1/2020 |
| WO | 2020005978 | 1/2020 |
| WO | 2020005981 | 1/2020 |

OTHER PUBLICATIONS

"Brown Jordan Outdoor Kitchens," by Danver Stainless Outdoor Kitchens information booklet, Apr. 2018 (28 pages).
Colon, Linda M. "Danver's Post and Panel System is a Hit with Architects, Builders, Developers & Designers," Danver Outdoor Kitchens Jun. 1, 2018 (2 pages).
File History for U.S. Appl. No. 15/262,733 downloaded Aug. 23, 2019 (326 pages).
File History for U.S. Appl. No. 15/937,666 downloaded Aug. 23, 2019 (201 pages).
"First Office Action," for Chinese Patent Application No. 20110876505.3 dated Dec. 18, 2018 (14 pages) with English Translation.
"International Preliminary Report on Patentability," for PCT Application No. PCT/US2016/051319 dated Sep. 27, 2018 (11 pages).
"International Search Report and Written Opinion," for PCT Application No. PCT/US2016/051319 dated Dec. 8, 2016 (14 pages).
"International Search Report and Written Opinion," for PCT Application No. PCT/US2018/024628 dated Jul. 11, 2018 (16 pages).
"Modular Outdoor Kitchen," Char-Broil Medallion Series Outdoor Kitchen information retrieved from https://www.charbroil.com/grills/modular-outdoor-kitchen on Aug. 8, 2019 (4 pages).
"Origami Kitchen Island Cart with Wheels," Description and Product Specs at least as early as Aug. 9, 2019 (5 pages).
"Traeger Wood Pellet Grills," Product Listing found on www.traegergrills.com at least as early as Aug. 9, 2019 (4 pages).
"Char-Broil Modular Outdoor Kitchen," Char Broil webpage Apr. 29, 2019, retrieved on Aug. 8, 2019, https://www.charbroil.com/grills/outdoor-kitchens/modular-outdoor-kitchen (4 pages).
"Danvers Post and Panel System," Danver webpage Jun. 1, 2018, retrieved on Aug. 8, 2019, https://danver.com/blog/post-and-panel-system/ (2 pages).
"Final Office Action," for U.S. Appl. No. 15/262,733 dated Sep. 5, 2019 (14 pages).
"International Preliminary Report on Patentability," for PCT Application No. PCT/US2018/024628 dated Oct. 10, 2019 (13 pages).
"International Search Report and Written Opinion," for PCT Application No. PCT/US2019/038993 dated Oct. 15, 2019 (13 pages).
"International Search Report and Written Opinion," for PCT Application No. PCT/US2019/039024 dated Oct. 15, 2019 (14 pages).
"International Search Report and Written Opinion," for PCT Application No. PCT/US2019/039027 dated Oct. 15, 2019 (13 pages).
"International Search Report and Written Opinion," for PCT Application No. PCT/US2019/039034 dated Oct. 15, 2019 (12 pages).
"International Search Report and Written Opinion," for PCT Application No. PCT/US2019/039039 dated Oct. 16, 2019 (14 pages).

(56) References Cited

OTHER PUBLICATIONS

"International Search Report and Written Opinion," for PCT Application No. PCT/US2019/039042 dated Oct. 16, 2019 (13 pages).
"Non-Final Office Action," for U.S. Appl. No. 15/262,733 dated Jan. 8, 2020 (18 pages).
"Non-Final Office Action," for U.S. Appl. No. 16/450,541 dated Oct. 1, 2019 (21 pages).
"Origami Carts and Racks," Origami webpage Apr. 20, 2016, retrieved on Dec. 9, 2019 via web.archive.org, https://origamirack.com (12 pages).
"Response to Final Office Action," for U.S. Appl. No. 15/262,733, filed Dec. 5, 2019 (11 pages).
"Response to Non Final Office Action," for U.S. Appl. 16/450,541, filed Dec. 30, 2019 (16 pages).
"Second Office Action," for Chinese Patent Application No. 201610876505.3 dated Aug. 29, 2019 (4 pages) with English Translation.
"Traeger Wood Pellet Grills," Traeger Grills webpage Apr. 7, 2006, retrieved on Dec. 9, 2019 via web.archive.org, https://www.traegergrills.com (2 pages).
"Final Office Action," for U.S. Appl. No. 16/450,541 dated Feb. 5, 2020 (19 pages).
"Third Office Action," for Chinese Patent Application No. 201610876505.3 dated Mar. 19, 2020 (8 pages) with English Translation.
"Response to Final Office Action," for U.S. Appl. No. 16/450,541 filed on May 5, 2020 (7 pages).

* cited by examiner

GRILL AND SIDE CART ATTACHMENT SYSTEMS AND METHODS

CLAIM OF PRIORITY

This application claims the benefit of U.S. Provisional Application No. 62/690,700, filed Jun. 27, 2018, the content of which is herein incorporated by reference in its entirety.

REFERENCE TO RELATED APPLICATIONS

The following five nonprovisional applications also claim priority to U.S. Provisional Application No. 62/690,700, are co-owned, and are filed on the event date herewith: U.S. application Ser. No. 16/450,356 titled, "Securing of Panels to Grill System," U.S. application Ser. No. 16/450,388, titled, "Grill System with Decorative Panels," U.S. application Ser. No. 16/450,493, titled, "Gas Guard in Grill Cart," U.S. application Ser. No. 16/450,510, titled, "Side Cart Locking Mechanism," and U.S. application Ser. No. 16/450,541, titled, "Grill Assembly with Foldable Cart," the contents of which for each application are herein incorporated by reference in their entirety.

The following four design applications are co-owned and are filed on the event date herewith: U.S. Design application Ser. No. 29/695,966 titled, "Grill System," U.S. Design application Ser. No. 29/695,969, titled, "Grill Assembly," U.S. Design application Ser. No. 29/695,973, titled, "Grill Cart," U.S. Design application Ser. No. 29/695,976, titled, "Side Assembly," the contents of which for each application are herein incorporated by reference in their entirety.

FIELD

The present application relates to grills and outdoor cooking systems. More specifically, the present application relates to modular grills and outdoor cooking systems.

BACKGROUND

Grilling is a cooking style that is especially popular in the United States. Grills are frequently not particularly portable or easy to set up. In many cases, grills are difficult to assemble due to numerous steps requiring the user to construct a frame with numerous components.

Attempts have been made to design grills that are easy to assemble after unloading from shipping containers. However, in many past systems, grill systems include a large number of pieces, require numerous steps to assemble, and some assembly steps require tools.

Some past systems mount a firebox on a foldable stand. However, the foldable stands can require complex set-up steps and, even in the folded configuration, some of the foldable stands take-up significant space.

Permanent outdoor grill installations are increasingly popular, and allow consumers to choose many finishes and options to create an attractive and functional outdoor kitchen environment. These installations are very expensive, and lack the flexibility of a moveable grill system.

SUMMARY

In an embodiment, a grill system is included. The grill system can include a grill assembly and a side assembly. The grill assembly can include a grill cart and a burner box configured to couple to a top portion of the grill cart. The burner box can include a first connection structure. The first side assembly can include a first side cart and a first top cap configured to couple to a top portion of the first side cart. The first top cap can include a second connection structure. The first connection structure and the second connection structure mate together to couple the grill assembly to the first side assembly.

In an embodiment, the first connection structure includes a first projection and a second projection extending in a similar direction from the same side of the burner box. The second connection structure defines a first connection aperture and a second connection aperture. The first connection aperture is configured for a portion of the first projection to fit within and the second connection aperture is configured for a portion of the second projection to fit within.

In an embodiment, the burner box further includes a third connection structure. The third connection structure includes a third projection and a fourth projection extending in a similar direction from a side of the burner box that is opposite from the side in which the first and second projections extend from.

In an embodiment, the grill system can further include a second side assembly. The second side assembly can include a second side cart and a second top cap. The second top cap includes a fourth connection structure. The fourth connection structure defines a third connection aperture and a fourth connection aperture. The third connection aperture is configured for a portion of the third projection to fit within and the fourth connection aperture is configured for a portion of the fourth projection to fit within.

In an embodiment, the first side assembly is configured in a right-hand configuration such that the second connection structure is on a left portion of the first side assembly and the second side assembly is configured in a left-hand configuration such that the fourth connection structure is on a right portion of the second side assembly.

In an embodiment, the first projection is at least 2 inches long and not more than 12 inches long, and the second projection is at least 2 inches long and not more than 12 inches long.

In an embodiment, the first projection is identical to the second projection.

In an embodiment, the first connection structure is graspable.

In an embodiment, the first top cap includes a functional element selected from the group consisting of: a second burner box, an ice box, a smoker, an oven, a sink, a work surface, a warming drawer, a sous vide cooker, a high heat burner, a ceramic cooker, a portion of a pellet grill, pellet feeder, pellet hopper, a pellet grill, or a refrigerator.

In an embodiment, the grill system can further include a second side assembly. The second side assembly can include a second side cart and a second top cap configured to couple to a top portion of the second top cap. The second top cap can include a fourth connection structure configured to mate with a third connection structure of the burner box.

In an embodiment, the first top cap includes a first functional element selected from the group consisting of a second burner box, an ice box, a smoker, an oven, a sink, a work surface, a warming drawer, a sous vide cooker, a high heat burner, a ceramic cooker, a pellet grill, a portion of a pellet grill, a pellet hopper, a pellet feeder, or a refrigerator; wherein the second top cap includes a second functional element selected from the group consisting of a second burner box, an ice box, a smoker, an oven, a sink, a work surface, a warming drawer, a sous vide cooker, a high heat burner, a ceramic cooker, a pellet grill, a portion of a pellet grill, a pellet hopper, a pellet feeder, or a refrigerator.

In an embodiment, the first functional element is not equivalent to the second functional element.

Various embodiments of a method of assembling a grill system are provided. In an embodiments, the method can include aligning a burner box with a top portion of a grill cart, wherein the burner box includes a first connection structure; coupling the burner box to the grill cart to form a grill assembly; aligning a first top cap with a first side cart, wherein the first top cap includes a second connection structure; coupling the first top cap with the first side cart to form a first side assembly; aligning the first side assembly with the grill assembly; and coupling the first side assembly to the grill assembly by mating the first connection structure with the second connection structure.

In an embodiment, the first connection structure includes a first projection and a second projection. The second connection structure defines a first connection aperture and a second connection aperture. The first connection aperture is configured for a portion of the first projection to fit within and the second connection aperture is configured for a portion of the second projection to fit within. Coupling the first side assembly to the grill assembly includes: inserting a portion of the first projection into the first connection aperture, and inserting a portion of the second projection into the second connection aperture.

In an embodiment, the method can include: aligning a second top cap with a second side cart, wherein the second top cap includes a fourth connection structure; coupling the second top cap with the second side cart to form a second side assembly; aligning the second side assembly with the grill assembly on an opposite side of the grill assembly from the first side assembly; and coupling the second side assembly with the grill assembly by mating a third connection structure with the fourth connection structure, wherein the burner box includes the third connection structure.

In an embodiment, the method can include: transitioning the first side cart from a folded position to an upright position prior to coupling the first side assembly to the grill assembly; and transitioning the second side cart from a folded position to an upright position prior to coupling the second side assembly to the grill assembly.

In an embodiment, the first connection structure includes a first projection and a second projection, and the third connection structure includes a third projection and a fourth projection; wherein the second connection structure defines a first connection aperture and a second connection aperture, wherein the first connection aperture is configured for a portion of the first projection to fit within and the second connection aperture is configured for a portion of the second projection to fit within; wherein the fourth connection structure defines a third connection aperture and a fourth connection aperture, wherein the third connection aperture is configured for a portion of the third projection to fit within and the fourth connection aperture is configured for a portion of the fourth projection to fit within; wherein coupling the first side assembly to the grill assembly includes: inserting a portion of the first projection into the first connection aperture, and inserting a portion of the second projection into the second connection aperture; wherein coupling the second side assembly to the grill assembly includes: inserting a portion of the third projection into the third connection aperture, and inserting a portion of the fourth projection into the fourth connection aperture.

In an embodiment, the first top cap includes a first functional element selected from the group consisting of a second burner box, an ice box, a smoker, an oven, a sink, a work surface, a warming drawer, a sous vide cooker, a high heat burner, a ceramic cooker, a pellet grill, a portion of a pellet grill, a pellet hopper, a pellet feeder, or a refrigerator; wherein the second top cap includes a second functional element selected from the group consisting of a second burner box, an ice box, a smoker, an oven, a sink, a work surface, a warming drawer, a sous vide cooker, a high heat burner, a ceramic cooker, a pellet grill, a portion of a pellet grill, a pellet hopper, a pellet feeder, or a refrigerator; wherein the first functional element is not equivalent to the second functional element.

In an embodiment, the first top cap includes a functional element selected from the group consisting of: a second burner box, an ice box, a smoker, an oven, a sink a work surface, a warming drawer, a sous vide cooker, a high heat burner, a ceramic cooker, a pellet grill, a portion of a pellet grill, a pellet hopper, a pellet feeder, or a refrigerator.

In an embodiment, the method can include: transitioning the first side cart from a folded position to an upright position prior to coupling the first side assembly to the grill assembly.

In an embodiment, a grill system is included. The grill system can include a grill assembly and a first side assembly. The grill assembly can include a grill cart and a burner box configured to couple to a top portion of the grill cart. The burner box can include a first connection structure. The first side assembly can include a first side cart and a first top cap configured to couple to a top portion of the first side cart. The first top cap can include a second connection structure. The first side cart is configured to be transitioned between a folded state and an upright state. The first connection structure and the second connection structure mate together to couple the grill assembly to the first side assembly. The first top cap includes a first functional element selected from the group consisting of: a second burner box, an ice box, a smoker, an oven, a sink a work surface, a warming drawer, a sous vide cooker, a high heat burner, a ceramic cooker, a pellet grill, a portion of a pellet grill, a pellet hopper, a pellet feeder, or a refrigerator.

In an embodiment, the grill system can include: a second side assembly can include a second side cart and a second top cap configured to couple to a top portion of the second side cart, the second top cap can include a further connection structure. The second side cart is configured to be transitioned between a folded state and an upright state. The burner box further includes a third connection structure. The second top cap includes a second functional element selected from the group consisting of: a second burner box, an ice box, a smoker, an oven, a sink a work surface, a warming drawer, a sous vide cooker, a high heat burner, a ceramic cooker, a pellet grill, a portion of a pellet grill, a pellet hopper, a pellet feeder, or a refrigerator.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following figures (FIGS.), in which.

While embodiments are susceptible to various modifications and alternative forms, specifics thereof have been shown by way of example and drawings, and will be described in detail. It should be understood, however, that the scope herein is not limited to the particular aspects described. On the contrary, the intention is to cover modifications, equivalents, and alternatives falling within the spirit and scope herein.

DETAILED DESCRIPTION

Described below and shown in the figures are various embodiments of components that can be included in a grill system. The grill system can include a grill assembly and one or more side assemblies. The grill assembly can include a burner box, which can be used to cook foods, such as meats and vegetables. Each side assembly can include a functional top cap to provide additional functionality to the grill system.

The grill and side assemblies can be shipped or transported in a folded configuration. In the folded configuration, the grill and side assemblies can have a smaller volume compared to the upright configurations. The smaller volume can reduce the cost of storing and transporting the components.

The grill and side assemblies described herein can be easily assembled. In many cases, the grill and side assemblies can be assembled by a single user or only two users. In many examples, the grill and side assemblies can be assembled without the use of tools. In many examples, the grill and side assemblies can be assembled quickly, such as in less than three minutes for each component.

In many examples, the grill systems described herein can provide a highly customizable, an easily assembled, and an easily installed outdoor kitchen environment. The grill systems described herein can include interchangeable functional top caps, such that a user can customize the grill system according to his or her needs and level of sophistication. The systems can include decorative side panels and/or decorative toe kick panels to provide a cohesive look to all of the components within the system. In some examples, decorative side and toe kick panels can be configured to attach at various different locations within the system, such that the same decorative side panel and toe kick panel can be used with multiple configurations of the system. There are not currently any systems available that provide the benefits of the systems and methods described herein.

Grill System with Grill Assembly and Side Assemblies

Figure 1:
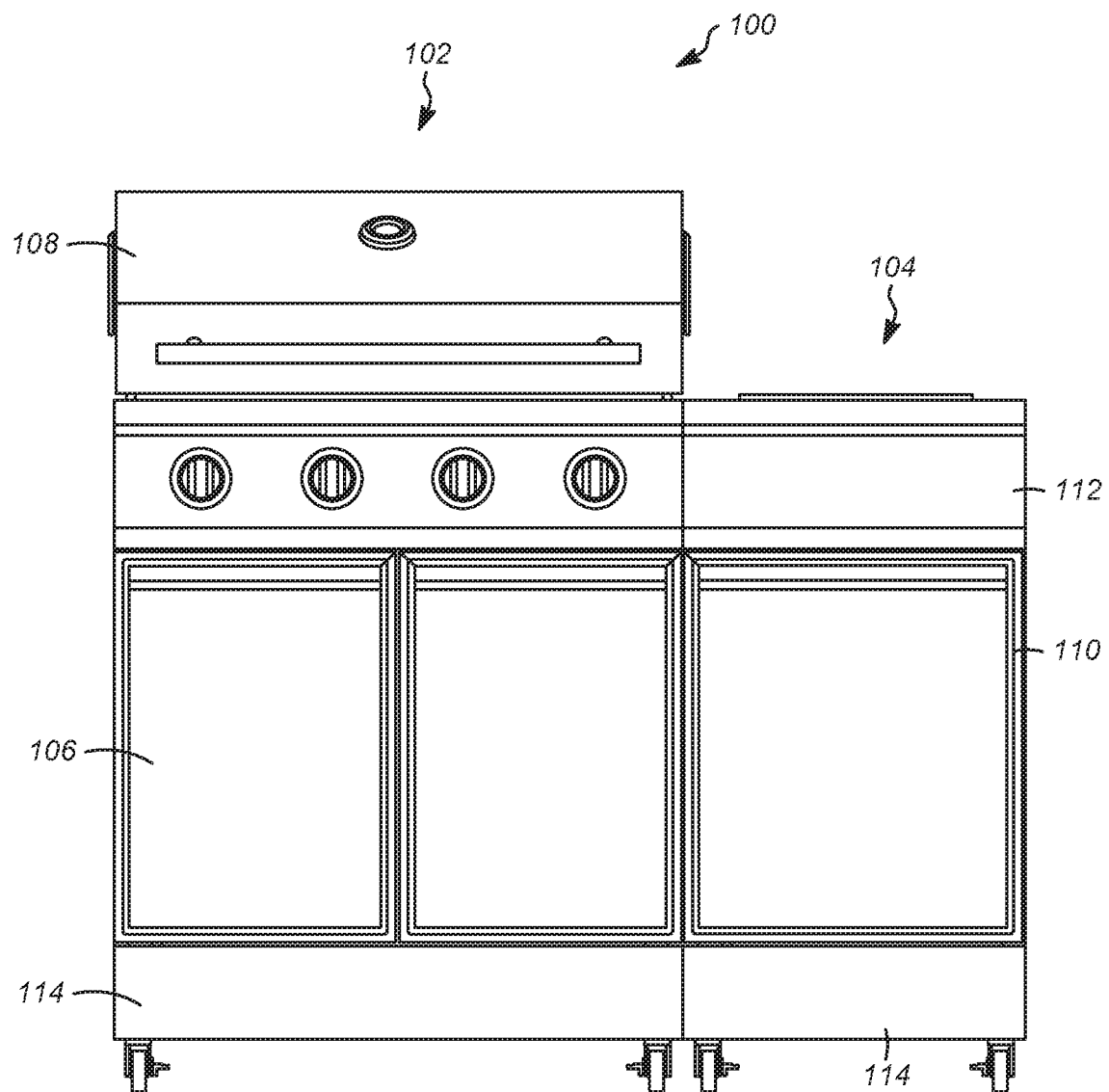
FIG. 1 is a front view of a grill system in accordance with various embodiments herein.

The figures show various views and embodiments of grill systems and components. FIG. 1 shows a grill system 100 including a grill assembly 102 and a side assembly 104. The grill assembly 102 can include a grill cart 106 and a burner box 108 (also referred to as a "firebox") coupled to a top portion of the grill cart 106. The side assembly 104 can include a side cart 110 and a top cap 112. The top cap 112 can be coupled to a top portion of the side cart 110.

Figure 2:
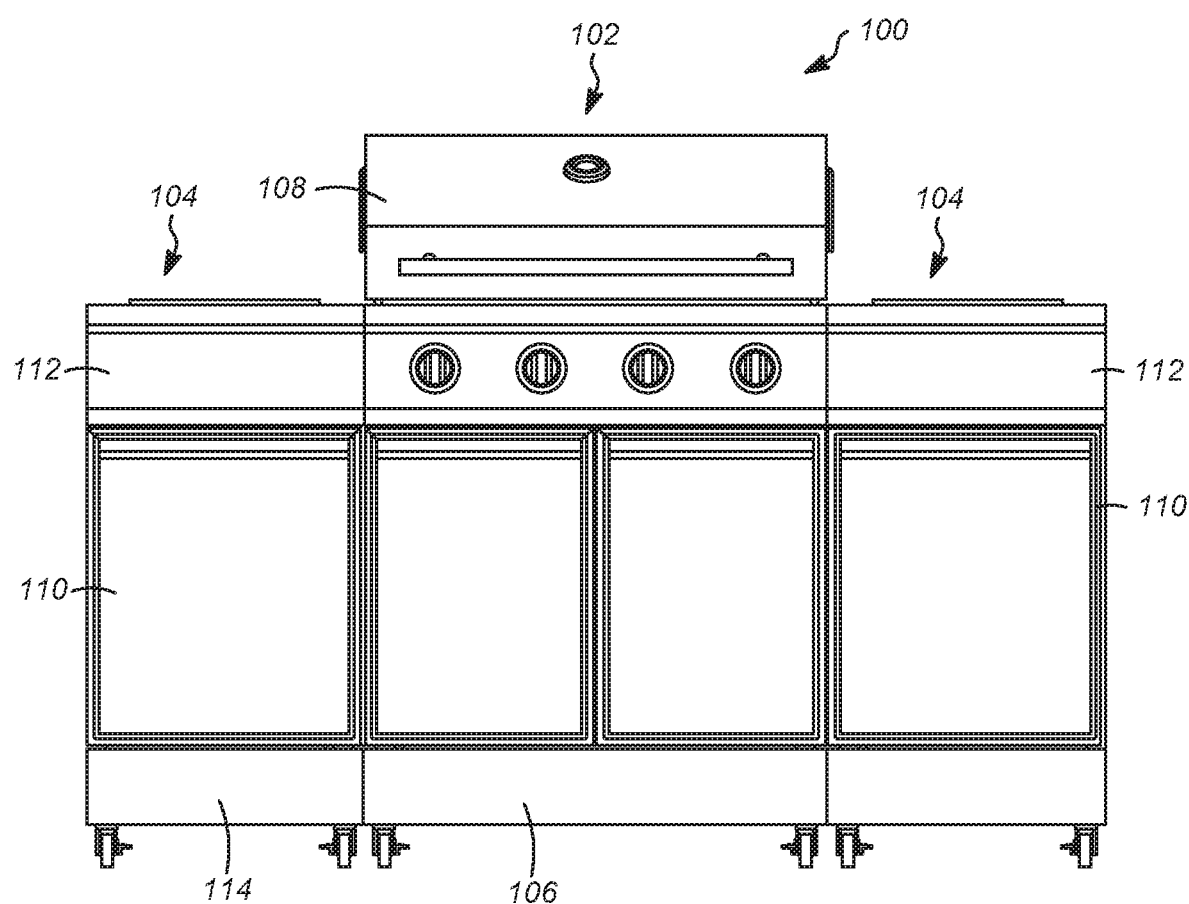
FIG. 2 is a front view of a grill system in accordance with various embodiments herein.
Figure 3:
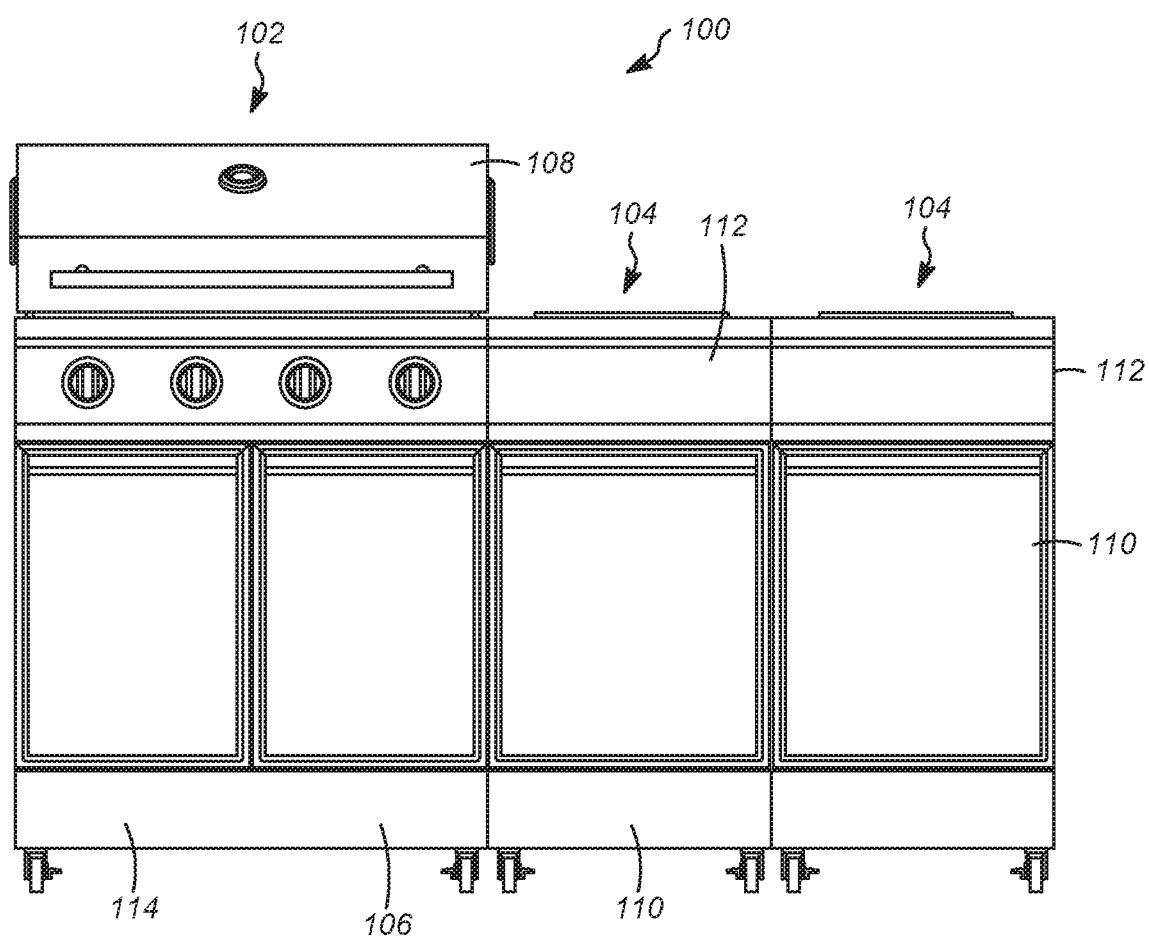
FIG. 3 is a front view of a grill system in accordance with various embodiments herein.

FIG. 2 shows a front view of a grill system 100 in accordance with various embodiments herein. In some embodiments, the grill system 100 can include a grill assembly 102, and two or more side assemblies 104. Each of the side assemblies 104 can include a side cart 110 and a top cap 112. In some embodiments, the side assemblies 104 can be disposed on opposite sides of the grill assembly 102, such as shown in FIG. 2. In some embodiments, the side assemblies 104 can be disposed on the same side of the grill assembly 102, such as shown in FIG. 3. In other embodiments, the grill system 100 can include additional side assemblies 104, such as three, four, five, six, or more side assemblies 104.

In some embodiments, all of the side assemblies 104 can be located on one side of the grill assembly 102, such as shown in FIG. 3. In some embodiments, side assemblies 104 can be located on both sides of the grill assembly 102, such as shown in FIG. 2. In some embodiments, an equal number of side assemblies 104 can be located on either side of the grill assembly 102. In some embodiments, the number of side assemblies 104 on one side of the grill assembly 102 can be greater than or less than the number of side assemblies 104 on the other side of the grill assembly 102.

In various embodiments, the burner box 108 can include a first connection structure, and the top cap 112 can include a second connection structure. The first connection structure can be configured to mate with the second connection structure to couple the grill assembly 102 to the side assembly 104.

In some embodiments, the grill assembly 102 can include a toe kick panel 114. The toe kick panel 114 can be coupled to a grill cart 106. In some embodiments, the side assembly 104 can include a toe kick panel 114. The toe kick panel 114 can be coupled to a side cart 110. In some embodiments, the toe kick panel 114 of the grill assembly 102 can include a connection feature and the toe kick panel 114 of the side assembly 104 can include a connection feature, such as two portions of a latch mechanism. The connection features of the two toe kick panels 114 can be coupled together to couple the grill assembly 102 with the side assembly 104. In some embodiments, the connection features of the toe kick panels 114 can be like other connection mechanisms described herein, such as the connection mechanism for coupling the burner box 108 to the grill cart 106, or the connection mechanism for coupling the grill assembly 102 with a side assembly 104.

In some embodiments, the grill cart 106 can include one or more panels on the sides of the grill cart 106. In some embodiments, the grill cart 106 can include a toe kick panel 114. In some embodiments, the toe kick panel 114 and the panel can include a common decorative design to provide a cohesive appearance.

Grill Assembly

Figure 4:
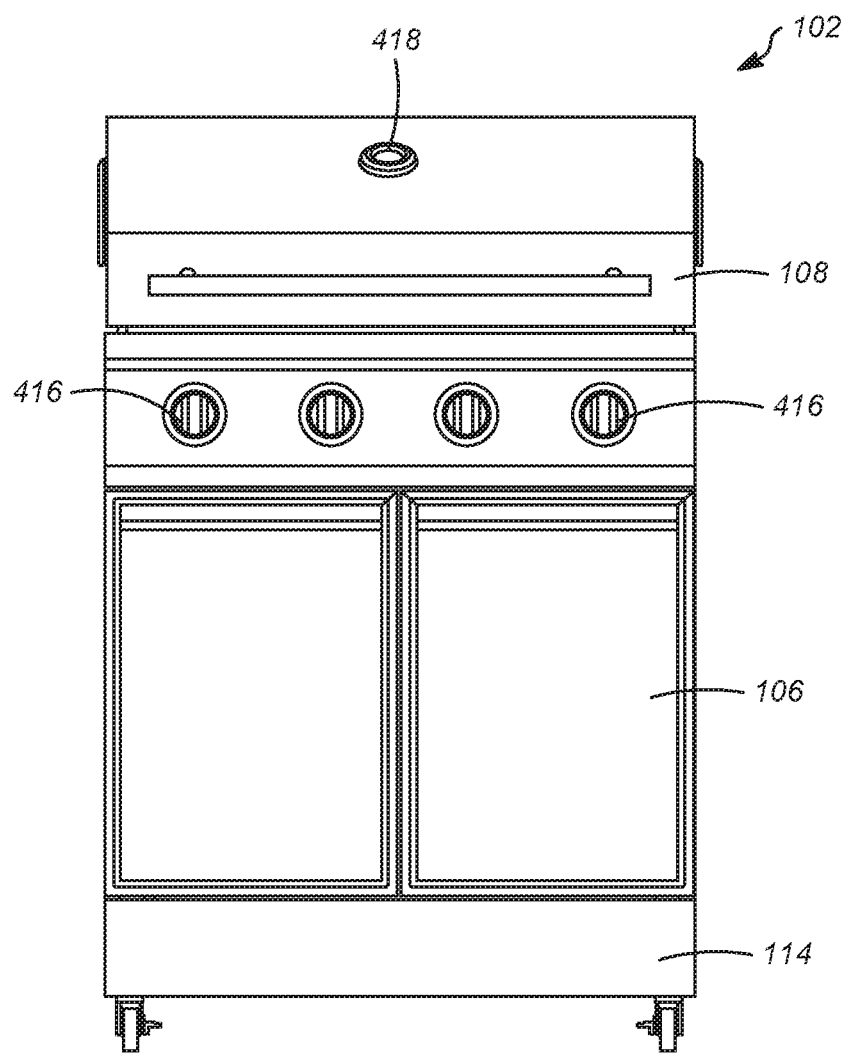
FIG. 4 is a front view of a grill assembly in accordance with various embodiments herein.

In reference now to FIG. 4, a front view of a grill assembly 102 is shown in accordance with various embodiments herein. The grill assembly 102 can include a burner box 108 coupled to a top portion of a grill cart 106.

Burner Box

The burner box 108 can be used to heat or cook foods. The burner box 108 can include an interior volume, which food is place into. The burner box 108 can include one or more grill grates disposed within the interior volume. The grill grates can be configured to support food which is being cooked or heated in the burner box 108. The burner box 108 can include a connection for a gas supply, such as a gas supply from a tank within the grill cart 106 or a connection to permanent gas supply, such as a commercial or residential gas supply.

The burner box 108 can include one or more burners within the interior volume, the burners can be configured to burn the gas and create heat in the interior volume. In some embodiments, the burner box 108 can burn charcoal, wood, or other fuel sources. In some embodiments, the burner box 108 can have the form of a pellet grill. In some embodiments, the burner box 108 can have the form of a charcoal grill. In some embodiments, the burner box 108 can include one or more control units 416, such as dials, buttons, or switches. The control units 416 can be configured to allow a user to start the flow of fuel, stop the flow of fuel, change the fuel flow rate, or ignite the fuel. In some embodiments, the grill cart 106 can include one or more control units 416. In some embodiments, the burner box 108 can include a thermometer 418, such as to measure the temperature of the interior volume.

Grill Cart

The grill cart 106 can provide a support or a stand for the burner box 108. The grill cart 106 can include a bottom portion 520 and a top portion 522 (shown in FIG. 5). The burner box 108 can be coupled to the top portion 522 of the grill cart 106. In some embodiments, the bottom portion 520 can include wheels 524, or casters, such as to provide easy portability for the grill assembly 102. In some embodiments, the wheels 524 can include a brake or lock to prevent the wheels from rotating thereby preventing the cart from moving. In various embodiments, the bottom portion 520 can include adjustable leveling feet or adjustable leveling wheels to allow a user to adjust the height of the feet or wheels, such as to accommodate for uneven surfaces, which can be common in outdoor applications.

The grill cart 106 can include one or more doors 526. The doors 526 can provide access to the interior of the grill cart 106. In various embodiments, the interior of the grill cart 106 can house a gas tank. The gas tank can supply the burner box 108 with gas. In some embodiments, the interior of the grill cart 106 can be configured to house or store other related equipment, such as tongs, spatulas, or brushes.

Figure 5:
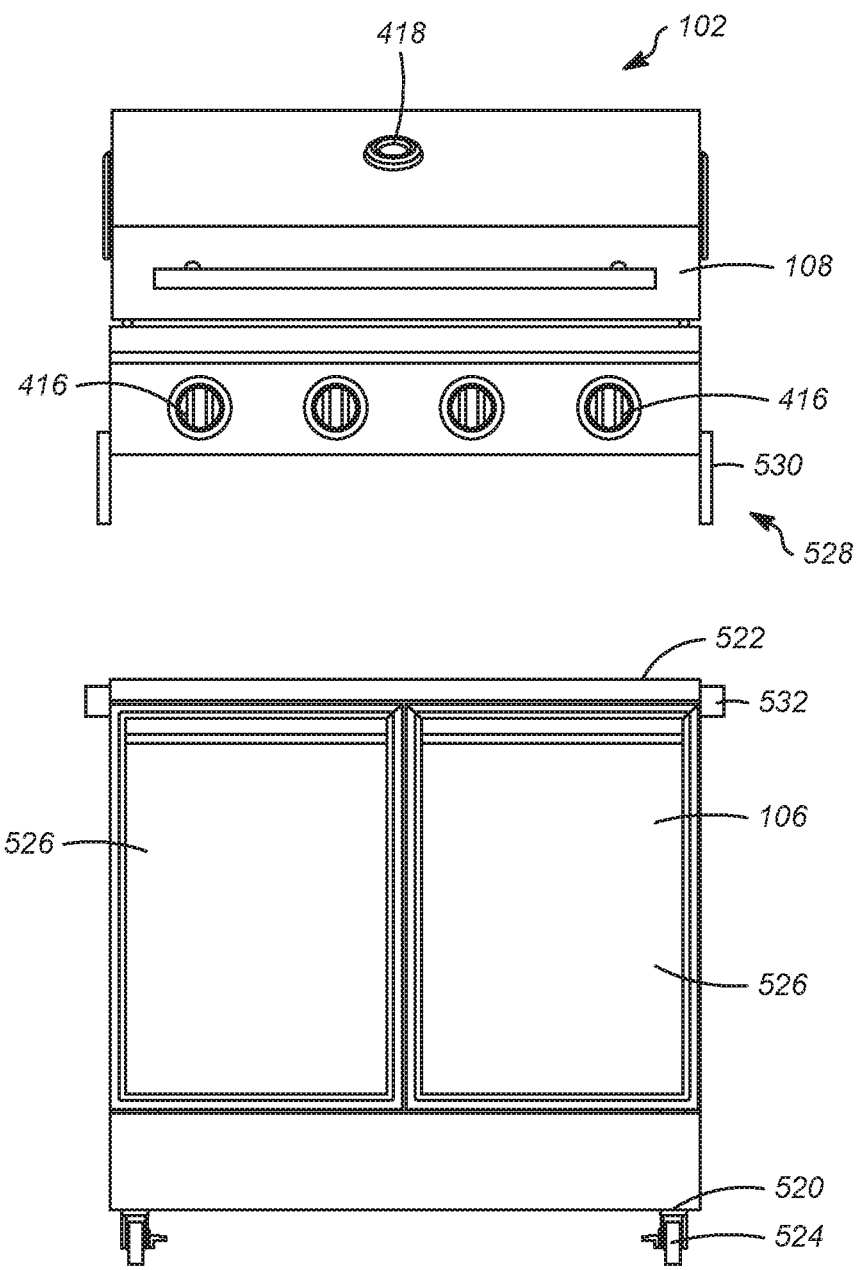
FIG. 5 is a front view of a grill assembly in accordance with various embodiments herein.
Figure 6:
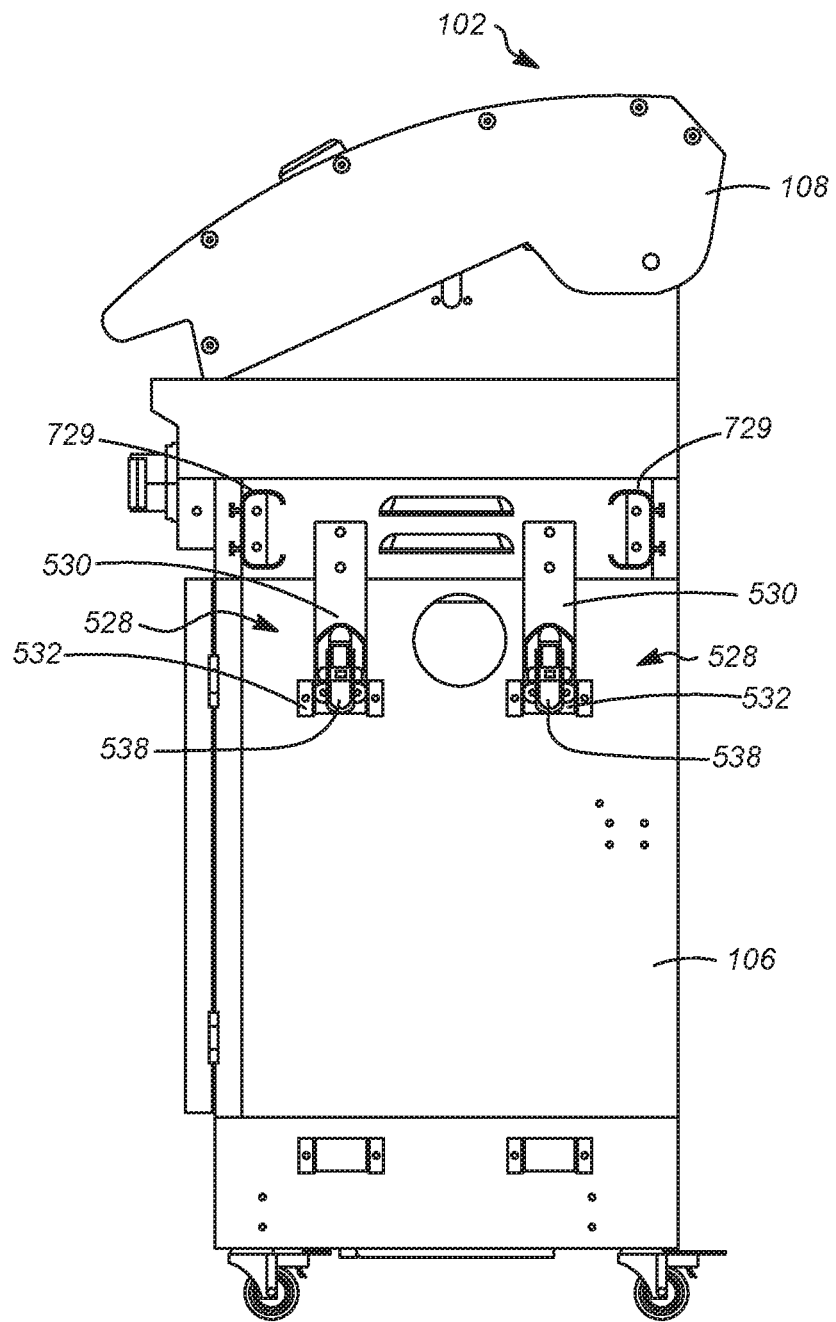
FIG. 6 is a side view of a grill assembly in accordance with various embodiments herein.
Figure 7:
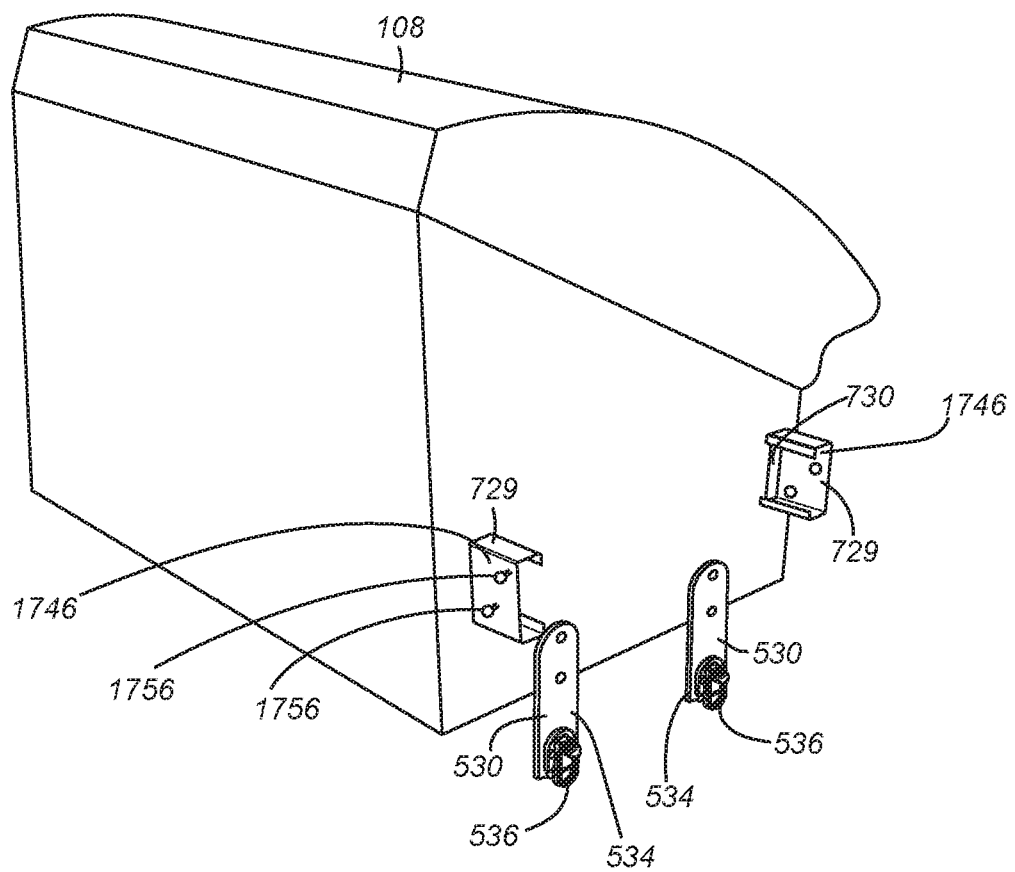
FIG. 7 is a perspective view of a burner box in accordance with various embodiments herein.

FIG. 5 shows a front view of the grill assembly 102 with the burner box 108 uncoupled from the grill cart 106. FIG. 6 shows a side view of the grill assembly 102 with the burner box 108 coupled to the grill cart 106. The burner box 108 can be coupled to the grill cart 106 via one or more latch mechanisms 528. In various embodiments, the burner box 108 can include a first portion 530 of the latch mechanism 528, and the grill cart 106 can include a second portion 532 of the latch mechanism 528. FIG. 6 shows the latch mechanism 528 coupling the burner box 108 with the grill cart 106. FIG. 7 shows a perspective view of a burner box 108 according to various embodiments, where the first portion 530 of the latch mechanism 528 is shown.

In some embodiments, the first portion 530 includes a projection or tongue 534 (FIG. 7) extending away from and below the burner box 108. In various embodiments, the second portion 532 defines an aperture, a receiving bracket or a receiving pocket. Coupling the burner box 108 with the grill cart 106 can include inserting the tongue 534 of the first portion 530 into the aperture, receiving bracket, or receiving pocket of the second portion 532. In some embodiments, the first portion 530 can define the aperture, receiving bracket, or receiving pocket, and the second portion 532 can include the projection or tongue.

In some embodiments, the first portion 530 can further include a hoop, ring, hook, or other device 536 that defines an opening (FIG. 7). The example shown in FIGS. 6-7 is a buckle structure that has a portion that rotates to move the buckle structure between open and a closed positions. The example shown in FIGS. 6-7 has two first portions 530 on each side of the burner box 108 and two second portions 532 on each side of the grill cart 106.

The second portion 532 can include a projection 538 (FIG. 6) for mating with the loop 536 of the buckle of the first portion 530. The first portion 530 can be configured to receive the projection from the second portion 532 into the opening defined by the loop 536. In various embodiments, the first portion 530 can transition between an open position and a closed position. In the open position the opening can easily receive the projection. In the closed position, the projection can be secured in the opening. FIG. 7 shows a view of the first portion 530 in the open position without the second portion 532. In other embodiments, the second portion 532 can include a hoop, ring, hook, or other device that defines an opening, and the first portion 530 can include a projection for mating with the loop of the second portion 532.

Other options for coupling a burner box to a grill cart are described in co-owned U.S. application Ser. No. 15/937,666 filed on Mar. 27, 2018, which is hereby incorporated by reference in its entirety.

Figure 17:
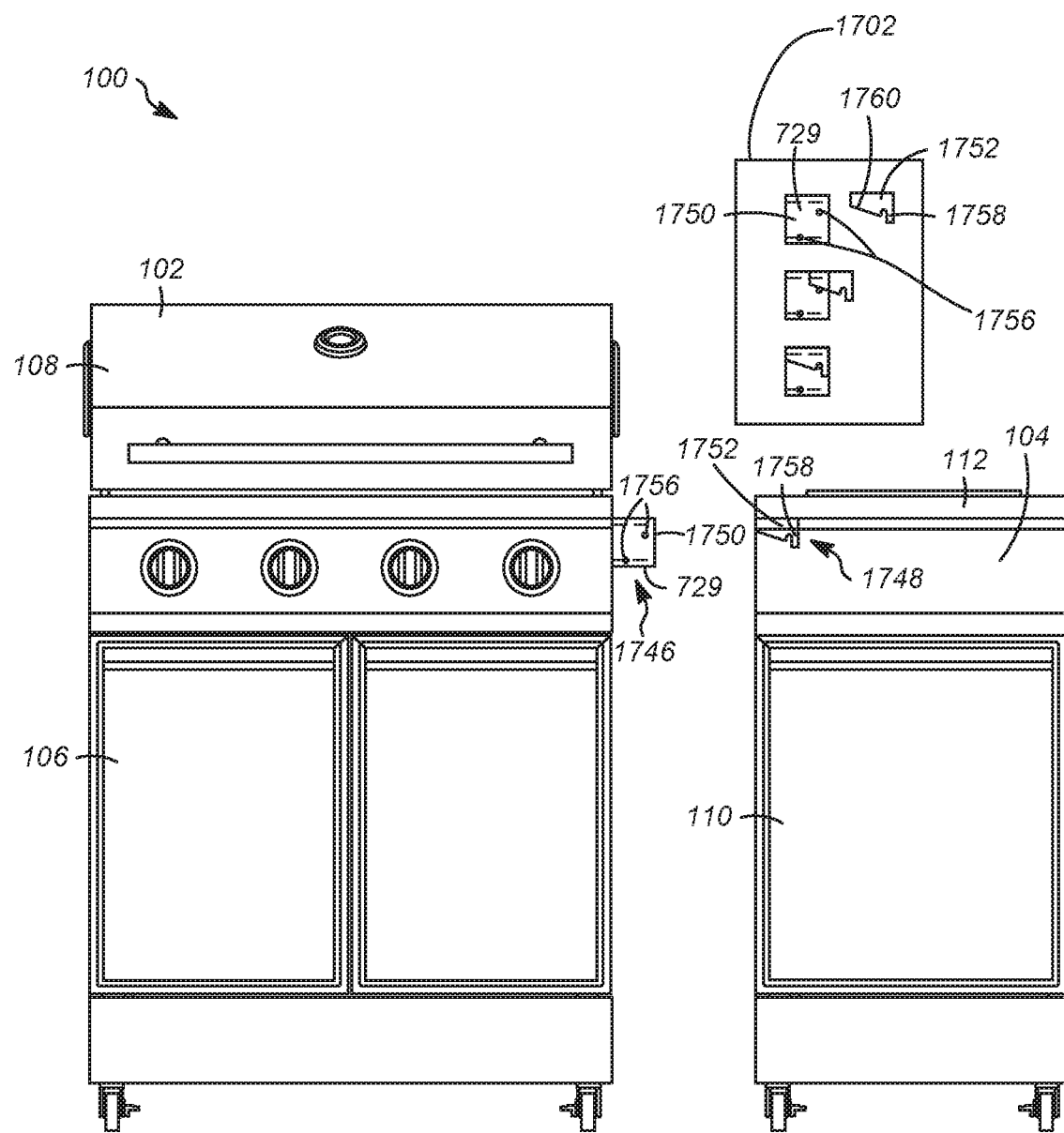
FIG. 17 is a front view of a grill system including a connection sequence drawings insert in accordance with various embodiments herein.

FIG. 7 shows a perspective view of a burner box 108 according to various embodiments. In various embodiments, the burner box 108 can include a bracket 729 or protrusion, that can extend away from the burner box 108 and provide a graspable handle. The bracket 729 can be configured to include or serve as a first connection structure 1746 to connect to a mating second connection structure on a side assembly 104. Further, in some embodiments, the bracket 729 can provide an extension for the first connection structure, such as to extend the first connection structure away from the burner box 108 into the top cap 112, as shown in FIG. 17. In some embodiments, a shelf or two shelves can be provided as a part of the grill system, where the shelf or shelves are configured to couple to the bracket 729 in the place of a side assembly 104 or a top cap 112.

Referring again to FIG. 7, in some embodiments, the burner box 108 can include two brackets 729. The brackets 729 can be spaced apart to provide adequate support for the connection between the burner box 108 and a top cap 112. In various embodiments, the bracket 729 can include a rounded top portion and/or a rounded bottom portion, such as to provide a more comfortable handle for a user to grasp during the process of assembling the grill. In some embodiments, a rounded top portion includes a rounded top left side and a rounded top right side, as shown in FIGS. 6 and 7. In some embodiments, a rounded bottom portion includes a rounded bottom left side and a rounded bottom right side, as shown in FIGS. 6 and 7. In some embodiments, the bracket 729 includes a base portion 730 that is configured to attach the bracket 729 to the burner box 108. The bracket 729 may be formed from a single piece of metal that is bent to form the top portion and bottom portion, such as to provide the rounded top portion and rounded bottom portion, as shown in the embodiment of FIG. 7. The base portion 730 may include one or more, such as two, apertures for bolts or other connecting elements used to secure the bracket 729 to the burner box 108.

Figure 8:
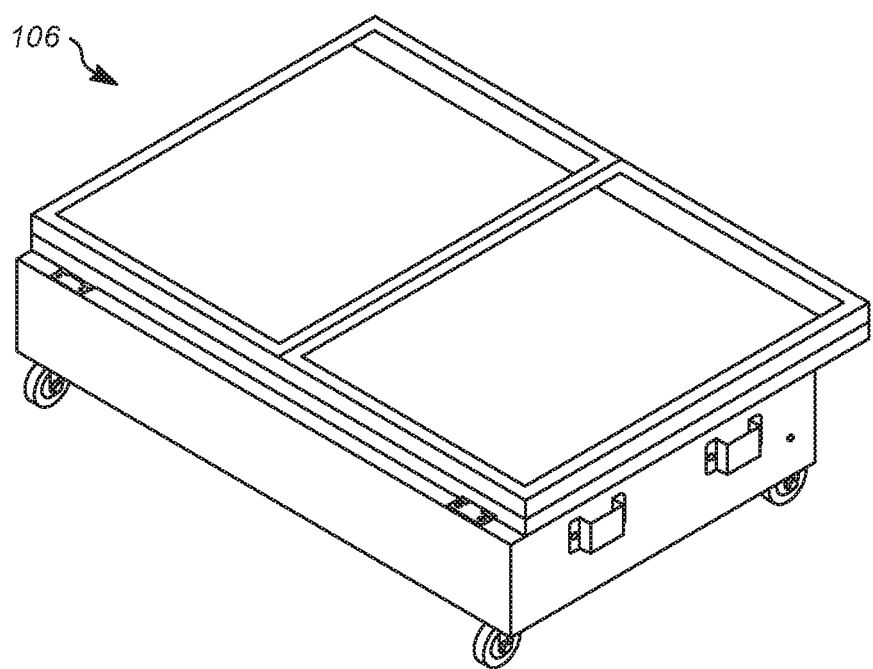
FIG. 8 is a perspective view of a grill cart in accordance with various embodiments herein.

FIG. 8 is a perspective view of a grill cart 106 in folded configuration in accordance with various embodiments herein. In various embodiments, the grill cart 106 can be transitioned between a folded state and an upright state. In an upright state, the grill cart 106 can provide a base or stand for the burner box 108. In the folded state, the grill cart 106 can be easily transported or stored. When in a folded state the grill cart 106 can have a smaller volume compared to when the grill cart 106 is in the upright state. In various embodiments, the grill cart 106 can be transitioned between the folded state and upright state without any tools. Various examples of grill carts with pivoting and rotating panels to allow the cart to transition between a folded state and an upright state can be found in co-owned U.S. application Ser. No. 15/937,666 filed on Mar. 27, 2018 and U.S. application Ser. No. 15/262,733 filed on Sep. 12, 2016, which are hereby incorporated by reference in their entirety.

Side Assemblies

Figure 9:
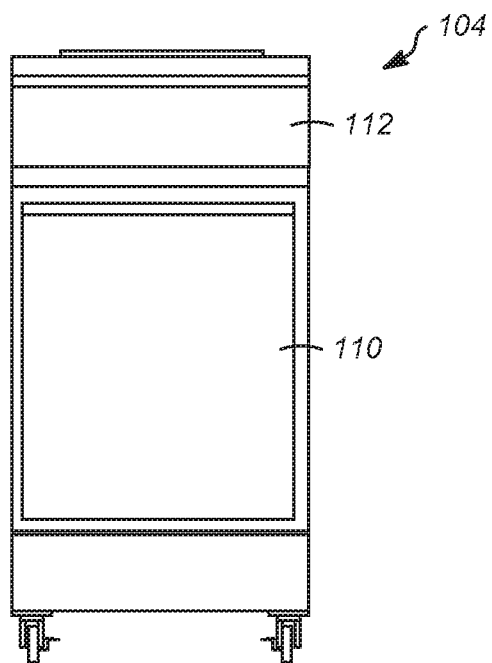
FIG. 9 is a front view of a side assembly in accordance with various embodiments herein.

In reference now to FIG. 9, a front view of a side assembly 104 is shown in accordance with various embodiments herein. In various embodiments, the side assemblies can be configured in a right-hand configuration, such that the side assembly 104 is configured to be coupled to the right side of the grill assembly 102. Similarly, a side assembly 104 can also be in a left-hand configuration, such that the side assembly 104 is configured to be coupled to the left side of the grill assembly 102.

In some embodiments, the connection elements for the connection between the grill assembly 102 and a side assembly 104 can include a male connection portion and a female connection portion. In some embodiments, the connection portions can be interchangeable, such as to convert a side assembly 104 in a left-hand configuration to a right-hand configuration, such as to allow a user to rearrange the components in the grill system 100.

Side Cart

The side cart 110 can provide a support or a stand for the top cap 112. In some embodiments, the side cart 110 can include a front frame, a back frame and one or two side frames. The side cart 110 can include a bottom portion 1034 and a top portion 1036 (shown in FIG. 10). The top cap 112 can be coupled to the top portion 1036 of the side cart 110. In some embodiments, the bottom portion 1034 can include wheels 1038, or casters, such as to provide easy portability for the side assembly 104. In some embodiments, the wheels 1038 can include a brake or lock to prevent the wheels from rotating thereby preventing the cart from moving. Similar to the grill cart 106, in various embodiments, the bottom portion 1034 can include adjustable leveling feet or adjustable leveling wheels to allow a user to adjust the height of the feet or wheels, such as to accommodate for uneven surfaces.

The side cart 110 can include one or more doors 1040. The doors 1040 can provide access to the interior of the side cart 110. In various embodiments, the interior of the side cart 110 can include one or more shelves. In some embodiments, the interior of the side cart 110 can be configured to house or store equipment.

In some embodiments, the side cart 110 can include a panel on the side of the side cart 110 that faces away from the grill assembly 102. In some embodiments, the side cart 110 can include a toe kick panel 114. In some embodiments, the toe kick panel 114 and the panel can include a common decorative design to provide a cohesive appearance. Further, the toe kick panel 114 and the panel on the grill cart 106 can include a common decorative design with the toe kick panel 114 and the panel on the side cart 110.

Top Cap

In various embodiments, the top cap 112 can include a functional element. In some embodiments, the functional element can include one of the following: a second burner box, an ice box, a smoker, an oven, a sink, a work surface, a warming drawer, a sous vide cooker, a high heat burner, a ceramic cooker, a pellet grill, or a refrigerator. In some embodiments, the function element can include a portion of a pellet grill, a portion of a smoker, a portion of a refrigerator, or a portion of another component. In some embodiments, the top cap 112 can include a portion of a pellet grill, such as a hopper, a feeder or an ignition element. In some embodiments of a grill system 100 with two or more side assemblies 104, each of the top caps 112 can include a different functional element. In some embodiments of a grill system 100 with two or more side assemblies 104, at least two of the functional elements can be the same. In some embodiments of a grill system 100 with two or more side assemblies 104, at least two of the functional elements can be different.

Figure 10:
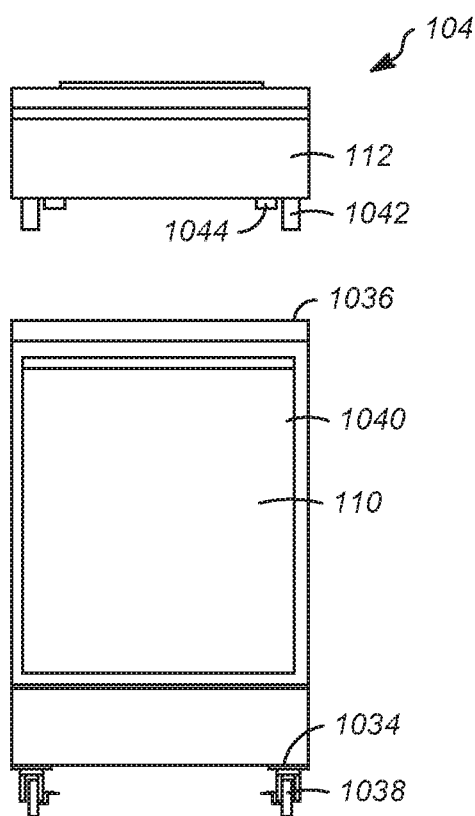
FIG. 10 is a front view of a side assembly in accordance with various embodiments herein.

FIG. 10 shows a front view of a side assembly 104 with the top cap 112 uncoupled from the side cart 110.

Figure 11:
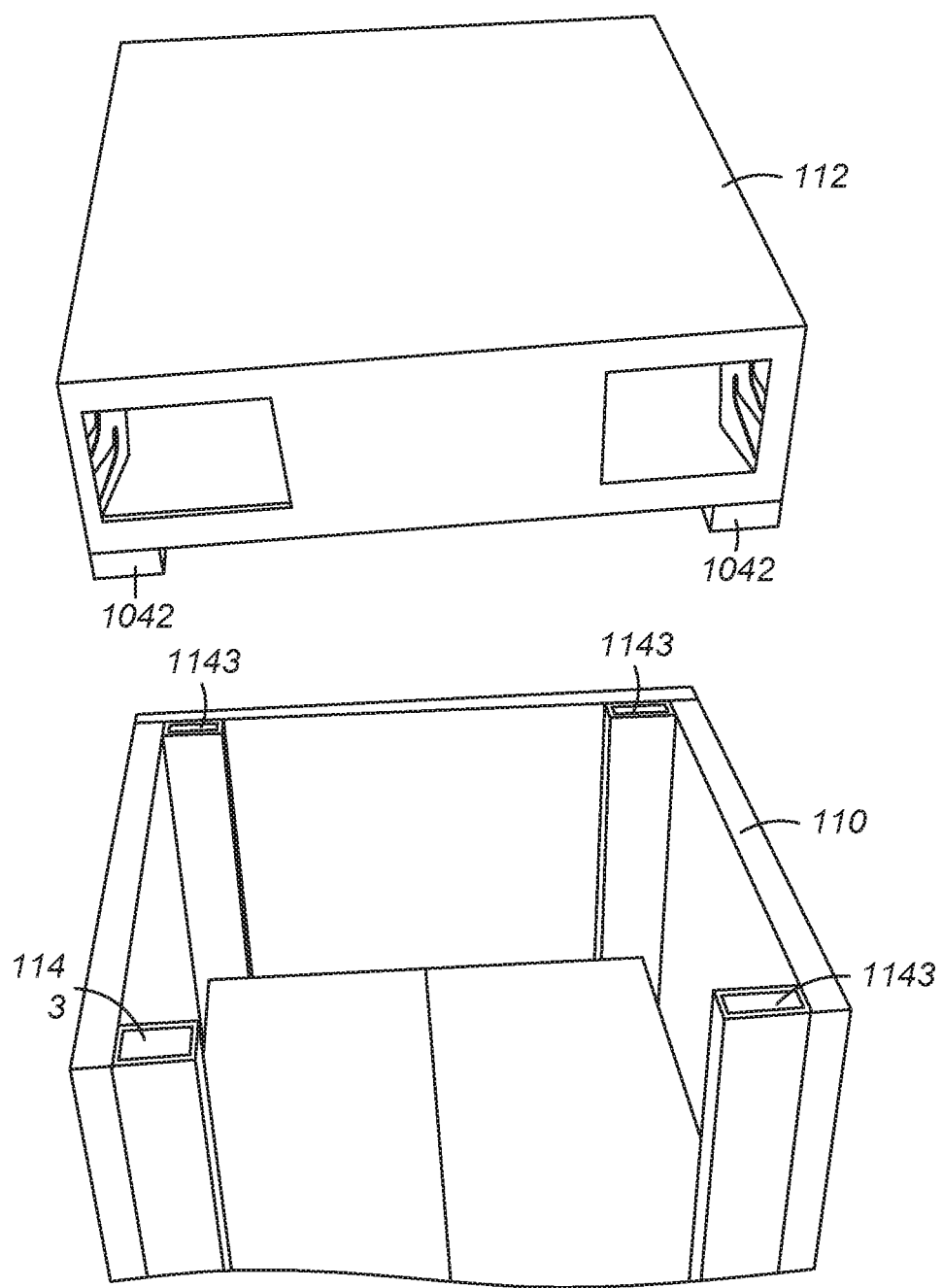
FIG. 11 is a perspective view of a top cap being coupled to a side cart in accordance with various embodiments herein.

FIG. 11 shows a perspective view of a top cap 112 being aligned with a side cart 110 to couple the top cap 112 with the side cart 110. In various embodiments, the top cap 112 can include one or more projections 1042 configured to be disposed in one or more recesses 1143 defined by the side cart 110. In some embodiments, the top cap 112 can include one projection 1042 in each of the corners, such as shown in FIG. 11. The side cart 110 can define a recess 1143 in each of the corners to align with the projections 1042.

Figure 20A:
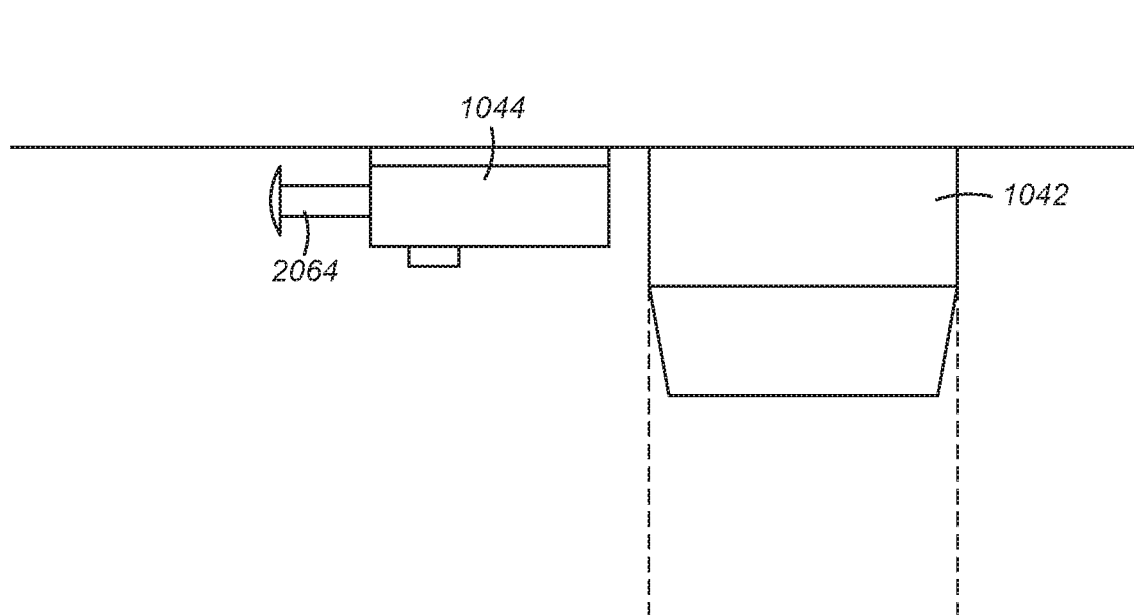
FIG. 20A is a schematic of the connection of a top cap with a side cart in accordance with various embodiments herein.
Figure 20B:
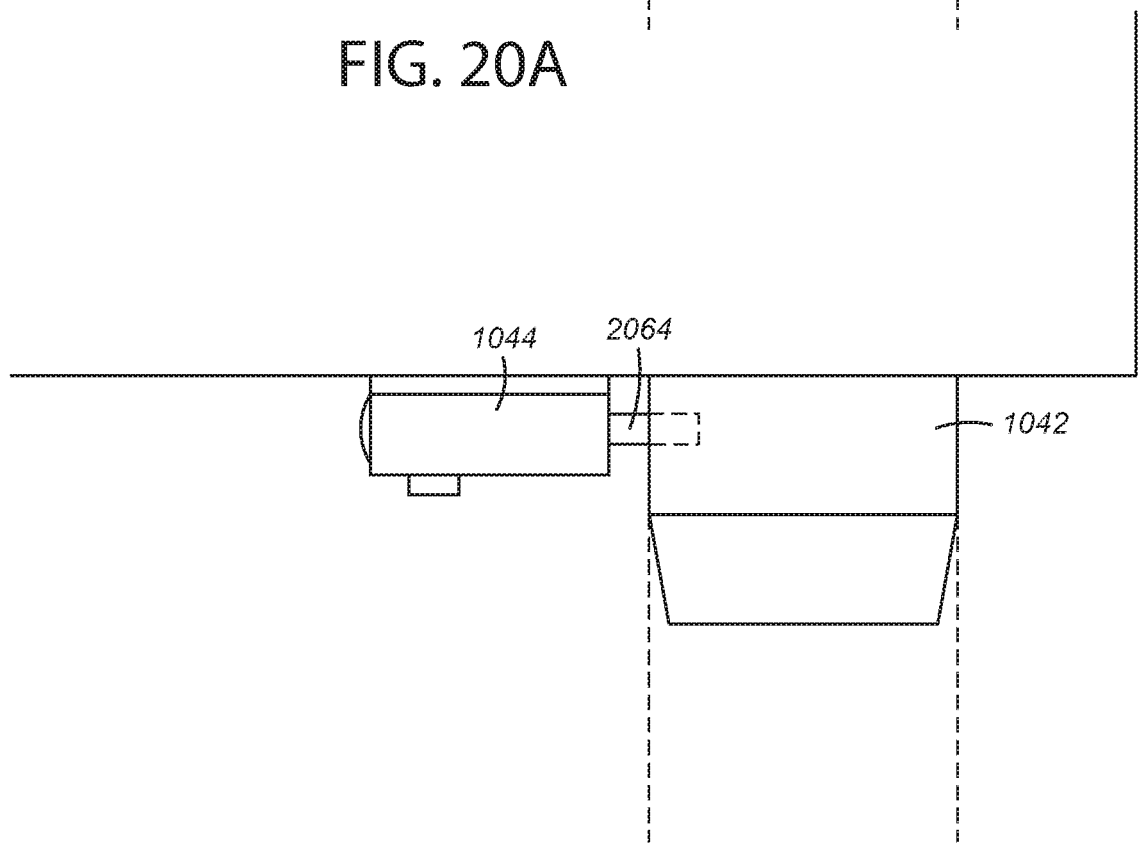
FIG. 20B is a schematic of the connection of a top cap with a side cart in accordance with various embodiments herein.

In some embodiments, the top cap 112 can also include a locking mechanism 1044. The locking mechanism 1044 can include a pin that extends perpendicular to the projection 1042, such as shown in and described herein with reference to FIGS. 20A and 20B.

Figure 12:
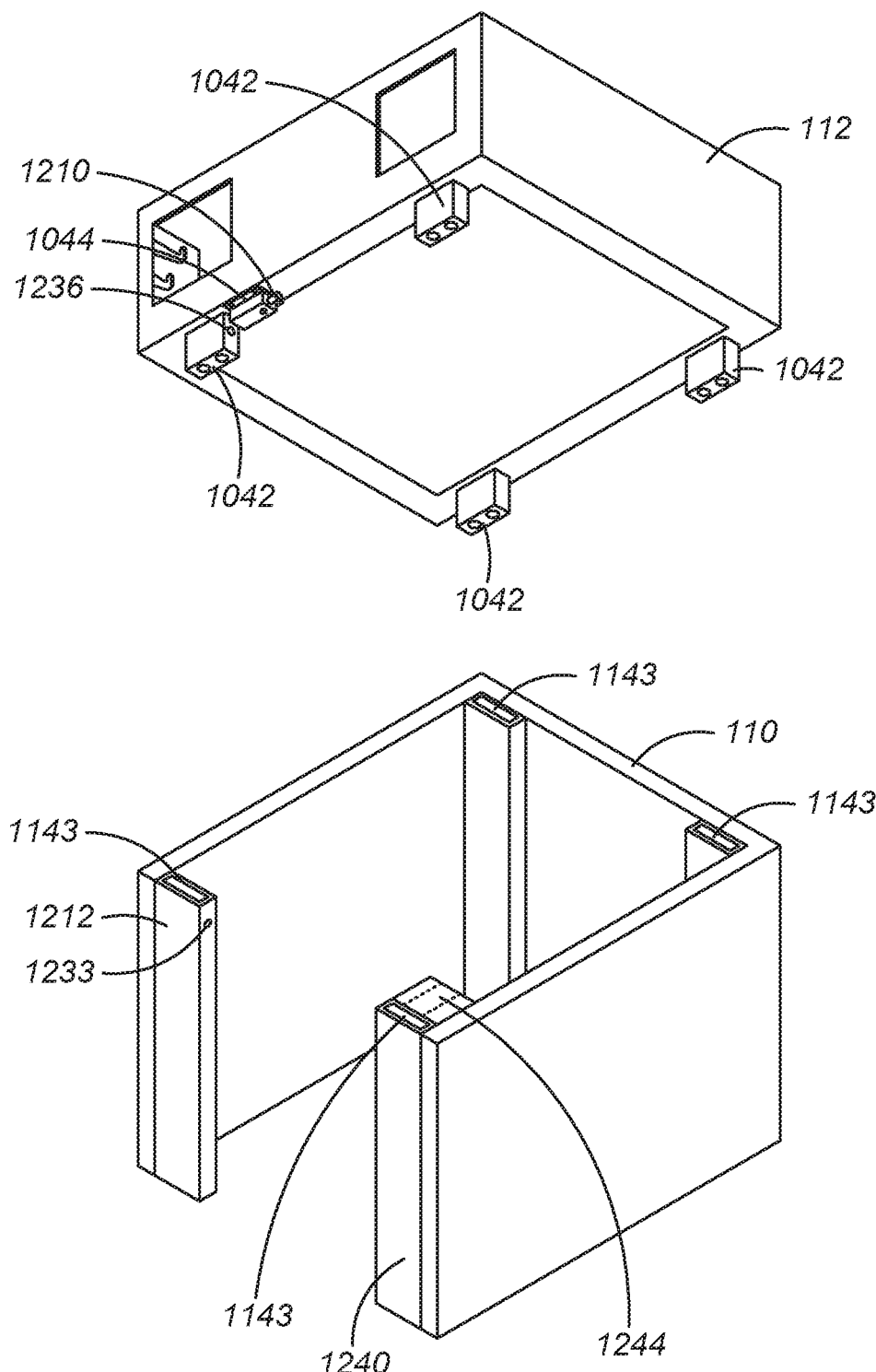
FIG. 12 is a perspective view of a top cap above a side cart, where a bottom perspective view of the top cap is shown and a top perspective view of a top portion of the side cart is shown, in accordance with various embodiments herein.
Figure 13:
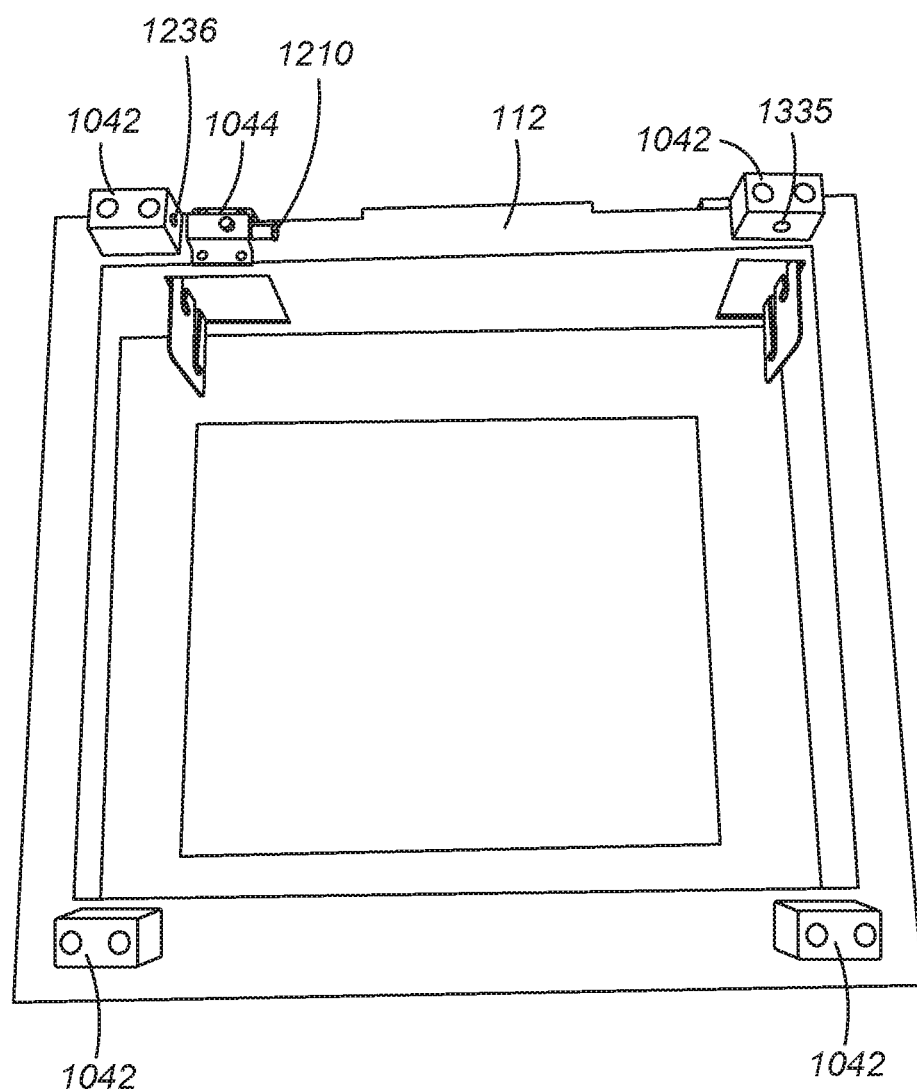
FIG. 13 is a bottom view of the top cap of FIG. 12 in accordance with various embodiments herein.

FIG. 12 shows a perspective view of a top cap 112 above a side cart 110, where a bottom perspective view of the top cap is shown and a top perspective view of the side cart is shown. The top cap 112 is positioned above the side cart 110 and is not yet coupled to a side cart 110. FIG. 13 shows a bottom view of a top cap 112. The projections 1042 can be aligned and inserted into the recesses 1143 in the side cart 110. In some embodiments the top cap 112 can include two locking mechanisms, such as a first locking mechanism 1044 and a second locking mechanism 1244 shown in FIGS. 12-13. Each locking mechanism secures the top cap 112 to the side cart 110. In other embodiment, a single locking mechanism is provided, three locking mechanisms are provided, or four locking mechanisms are provided. Each locking mechanism can be provided near a corner of the side assembly.

In some embodiments, as shown in FIGS. 12-13, the top cap 112 can include a locking mechanism 1044 at one corner and the side cart 110 can include a locking mechanism 1244, at another corner. In some embodiments, the first locking mechanism 1044 is on the top cap 112 and the second locking mechanism 1244 is on the side cart 110. The first locking mechanism 1044 can include a pin 1210 that, in the locked position, can extend into a post 1212, such as through aperture 1233 shown in FIG. 12. Because the pin 1210 extends from the top cap 112 into the aperture 1233 that is defined by post 1212 of the side cart 110, the pin 1210 secures the top cap 112 to the side cart 110. Optionally, the pin 1210 may further extend beyond the wall of the post and into the recess 1236 defined in the corresponding projection 1042 of the top cap 112. In one embodiment, after the top cap 112 is placed onto the side cart 110, the pin 1210 is slid toward the post 1212 to move between an unlocked position and a locked position.

Similarly, the locking mechanism 1244 on the side cart 110 can include a pin that is slid between an unlocked position and a locked position. The pin of the locking mechanism 1244 is not visible in FIG. 12, but the locking mechanism 1244 can be substantially identical to the locking mechanism 1044. In the locked position, the pin of the locking mechanism 1244 can extend through a post 1240 that defines the recess 1143 and into a projection 1042, such as into the recess 1335 defined in the projection 1042 shown in FIG. 13. Because the pin of the locking mechanism 1244 extends from the side cart 110 into the recess 1335 defined in the projection of the top cap 112, the pin secures the top cap 112 to the side cart 110.

Figure 14:
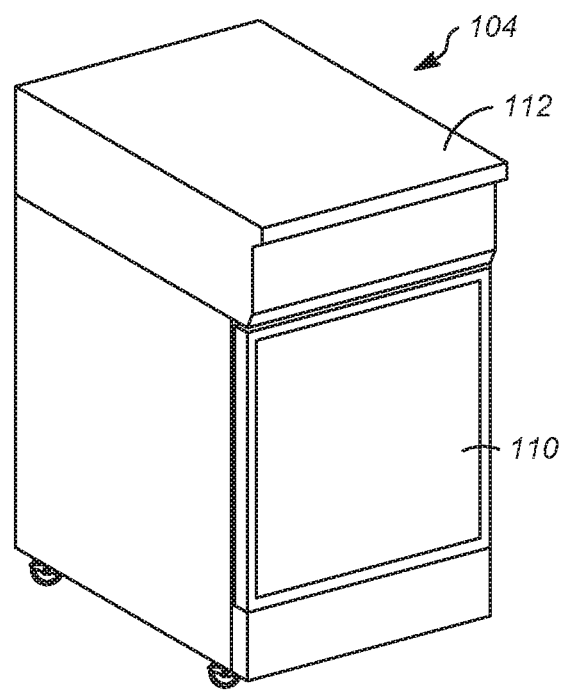
FIG. 14 is a perspective view of a side assembly in accordance with various embodiments herein.
Figure 15:
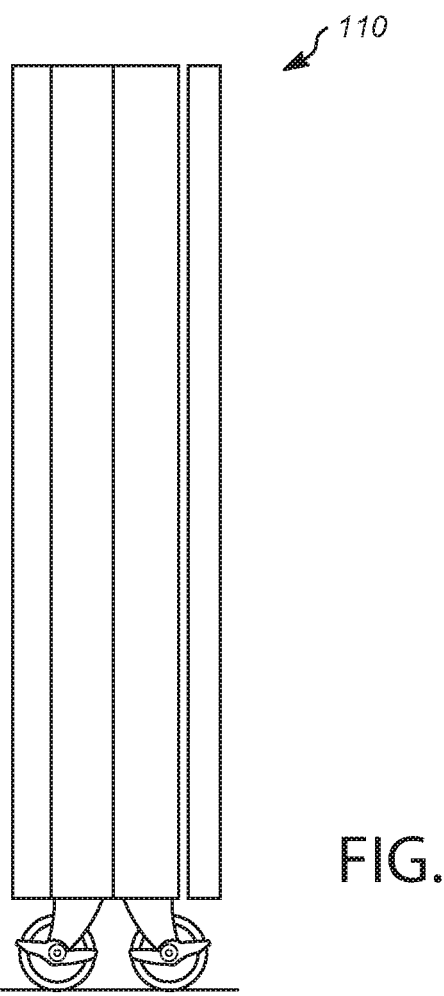
FIG. 15 is a side view of a side cart in accordance with various embodiments herein.

FIG. 14 shows a perspective view of the side assembly 104 with the top cap 112 coupled to the side cart 110. FIG. 15 is a side view of a side cart 110 in a folded configuration in accordance with various embodiments herein. In various embodiments, the side cart 110 can be transitioned between a folded state and an upright state. In an upright state, the side cart 110 can provide a base or stand for the top cap 112. In the folded state, the side cart 110 can be easily transported or stored. In a folded state the side cart 110 can have a smaller volume compared to when the side cart 110 is in the upright state. In various embodiments, the grill cart 106 can be transitioned between the folded state and uprights state without any tools.

Figure 16A:
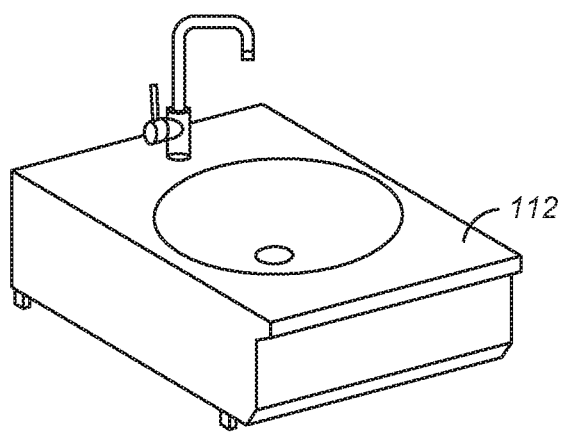
FIG. 16A-16I are perspective views showing various top caps in accordance with various embodiments herein.
Figure 16B:
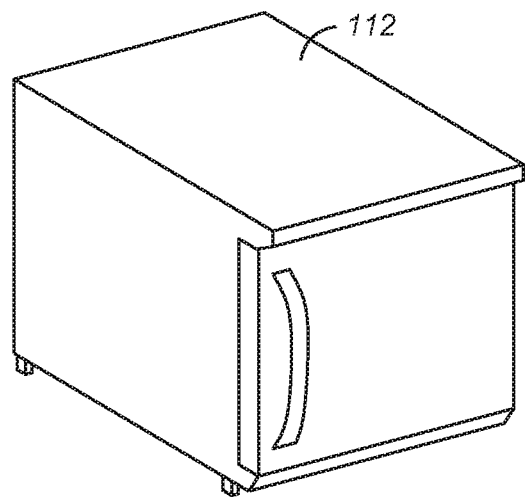
Figure 16C:
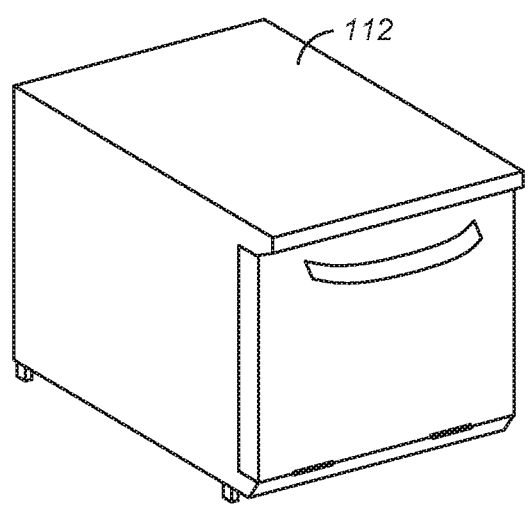
Figure 16D:
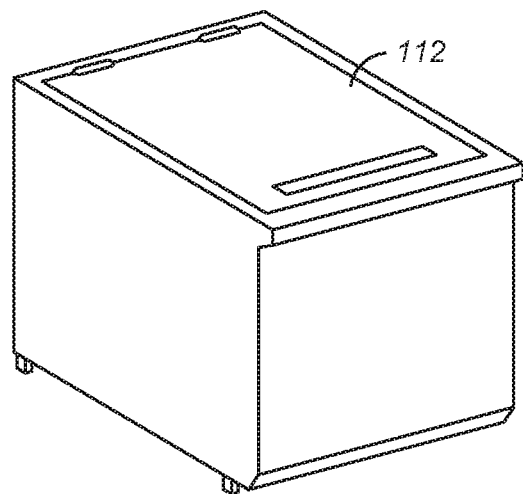
Figure 16E:
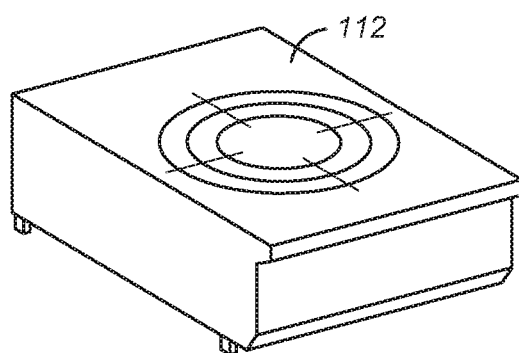
Figure 16F:
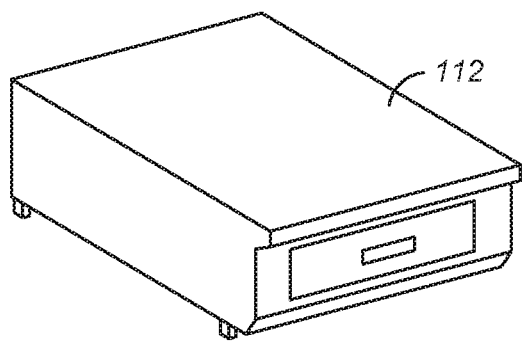
Figure 16G:
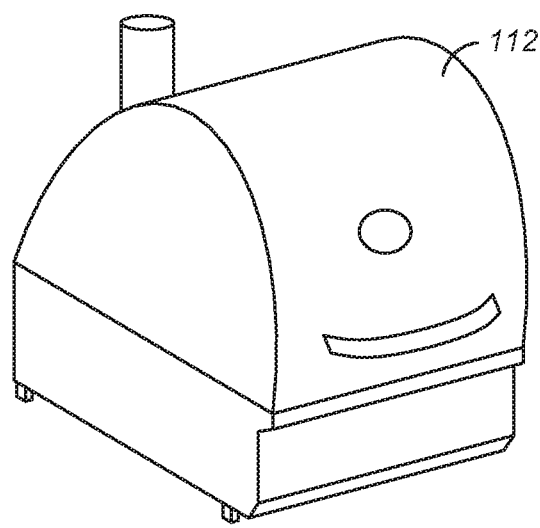
Figure 16H:
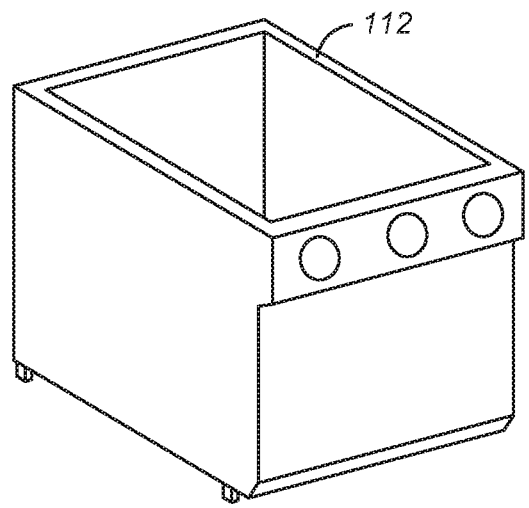
Figure 16I:
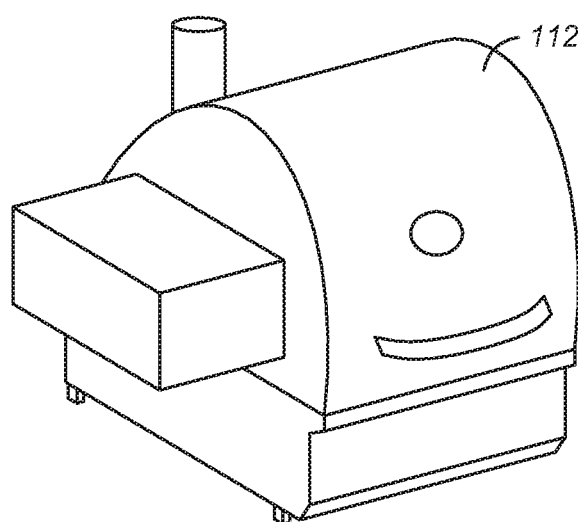

FIG. 16A-16I show perspective views of various different embodiments of top caps 112. In various embodiments, the top cap 112 can include a sink, such as shown in FIG. 16A. In various embodiments, the top cap 112 can include a refrigerator, such as shown in FIG. 16B. In various embodiments, the top cap 112 can include an oven, such as shown in FIG. 16C. In various embodiments, the top cap 112 can include an ice box, such as shown in FIG. 16D. In various embodiments, the top cap 112 can include a high heat burner, such as shown in FIG. 16E. In various embodiments, the top cap 112 can include a warming drawer, such as shown in FIG. 16F. In various embodiments, the top cap 112 can include a smoker, a second burner box, or a ceramic cooker, such as shown in FIG. 16G. In various embodiments, the top cap 112 can include a sous vide cooker, such as shown in FIG. 16H. In various embodiments, the top cap 112 can include a pellet grill, such as shown in FIG. 16I. In some embodiments, the top cap 112 can include a portion of a pellet grill, such as a pellet feeder or a pellet hopper.

In some embodiments, the top cap 112 can include an electrical connection, such as to power the auger or feeder of a pellet grill or a compressor in a refrigerator. In some embodiments, the grill cart 106 can include a main power connection, such as to connect to an external power supply, and each of the side assemblies 104 that require electricity can connect to a power supply in the grill cart 106. In some embodiments, a side assembly 104 can include the main power connection. The other side assemblies 104 and the grill assembly 102 can connect to a power supply in the side assembly 104 that includes the main power connection.

As discussed above in regards to FIGS. 2-3, the grill system 100 can be arranged in various ways. In some embodiments the grill system 100 can be arranged such that all of the side assemblies 104 that include hot components that include a heating element (e.g. high heat burner, smoker, pellet grill) can be located on one side of the grill assembly 102 and the side assemblies 104 that include cold components that include a cooling element or structure used for cooling (e.g. refrigerator, ice box) can be located on the opposite side of the grill assembly 102 from the hot components. In some embodiments, neutral components that do not include a heating element, cooling element or structure used for cooling (e.g. work surface, sink) can be located on the cold component side, the hot component side, or dispersed between the two sides.

FIG. 17 shows a front view of a grill system 100, along with a connection sequence drawing insert 1702. The burner box 108 can include a first connection structure 1746, and the top cap 112 can include a second connection structure 1748. The first connection structure 1746 is configured to mate with the second connection structure 1748 to couple the grill assembly 102 to the side assembly 104. In some embodiments, the burner box 108 can include two or more first connection structures 1746 on the same side or surface, and the top cap 112 can include two or more second connection structures 1748 on the same side or surface, such as to provide two connection locations between a top cap 112 and a burner box 108. In some embodiments, the burner box 108 can include four first connection structures 1746, such as two first connection structure 1746 on each side of the burner box 108. In some embodiments, multiple first connection structures 1746 can be identical to each other or mirror images of each other. In some embodiments, the two connection locations can be substantially horizontally aligned with each other. In some embodiments, the two connection locations can be substantially vertically aligned with each other.

In some embodiments, a top cap 112 can include two second connection structures 1748. In some embodiments, the two second connection structures 1748 can be on the same side or surface of the top cap 112, such as to mate with two connection structures on the same side or surface of the burner box 108.

In seen in the embodiments of FIGS. 6-7 and 17-18, in some examples, first connection structure 1746 is a male connection element 1750 and second connection structure 1748 is a female connection element 1752, or the reverse can be true. In some embodiments, one of the burner box 108 and the top cap 112 can include a female connection element 1752 and the other can include a male connection element 1750. In various embodiments, the first connection structures 1746, also referred to as the male connection element 1750, can include a bracket 729 or protrusion, that can extend away from the burner box 108 or top cap 112 and provide a graspable handle. Further, in some embodiments, the bracket 729 can provide an extension for the connection structure, such as to extend the connection structure from the burner box 108 into the top cap 112, as shown in FIG. 17.

In various embodiments, the male connection element 1750 can include a projection 1756. The projection 1756 can be configured to mate with a recess 1758 defined by the female connection element 1752. In some embodiments, the male connection element 1750 extends from the burner box 108 and the female connection element 1752 is within the top cap 112. In other embodiments, the female connection element 1752 extends from the burner box 108 and the male connection element 1750 is within the top cap 112.

The steps of connecting the male connection element 1750 with the female connection element 1752 will now be described with reference to the inset schematic depiction of the connection sequence in FIG. 17. The female connection element 1752 can include a sloped surface 1760 configured for the projection 1756 to run along as the side assembly 104 is moved towards the grill assembly 102. The projection 1756 running along the sloped surface 1760 can raise or lift the side assembly 104 relative to the grill assembly 102. Once the projection 1756 has traveled past the end of the sloped surface 1760, the side assembly 104 can be lowered into a resting position, thereby resulting in the projection 1756 being disposed within the recess 1758 defined by the connection structure. The recess 1758 can restrict the movement of the projection 1756, such that the side assembly 104 cannot be separated from the grill assembly 102 without first being lifted or raised to displace the projection 1756 from the recess 1758.

In some embodiments, the top cap 112 can include the male connection element 1750 and the burner box can include the female connection element 1752. In some embodiments, the bracket 729 can include the female connection element 1752, such as the recess 1758 and the sloped surface 1760 being disposed on the bracket 729.

In various embodiments, the first connection structures 1746 such as bracket 729 for coupling the side assemblies with the grill assembly can be graspable, such that a user can hold a connection structure to move or lift the burner box. In some embodiments, the first connection structure 1746 can have a length of at least two inches, three inches, four inches, or five inches, such as to provide sufficient graspable structure for an average human hand. In various embodiments, the first connection structure 1746 can have a length of no more than 12 inches. In various embodiments, the first connection structure 1746 can have a length of no more than 10 inches, no more than 8 inches, or no more than 6 inches.

Figure 18:
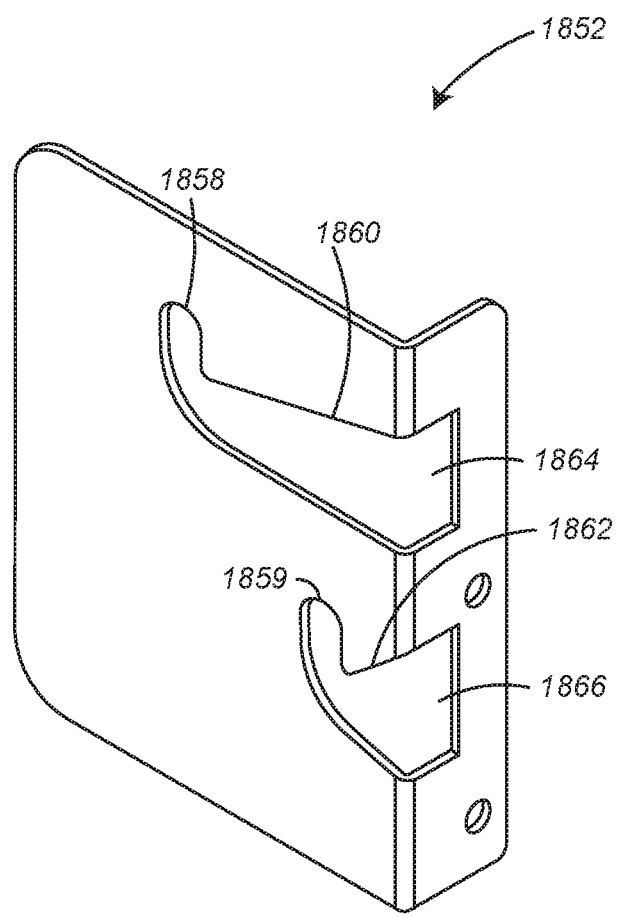
FIG. 18 is a perspective view of a connection structure in accordance with various embodiments herein.

FIG. 18 shows an alternate embodiment of a female connection element 1852. In some embodiments, the female connection element 1852 can include two apertures 1864, 1866, such as to couple with two projections from a male connection element, such as first connection structure 1746 shown in FIGS. 6-7, 17 and 19. In some embodiments, the two apertures 1864, 1866 are the same as each other. In some embodiments, the two apertures 1864, 1866 can have different shapes. In some embodiments, each aperture 1864, 1866 can include a sloped surface 1860, 1862 and a recess 1858, 1859. In some embodiments, a top aperture 1864 is longer than a bottom aperture 1866 as shown in FIG. 18. Now referring to FIGS. 18 and 19, the top aperture 1864 of FIG. 18 is configured to receive the top projection 1756 of the bracket 729, while the bottom aperture 1866 of FIG. 18 is configured to receive the bottom projection 1756 of the bracket 729.

Figure 19:
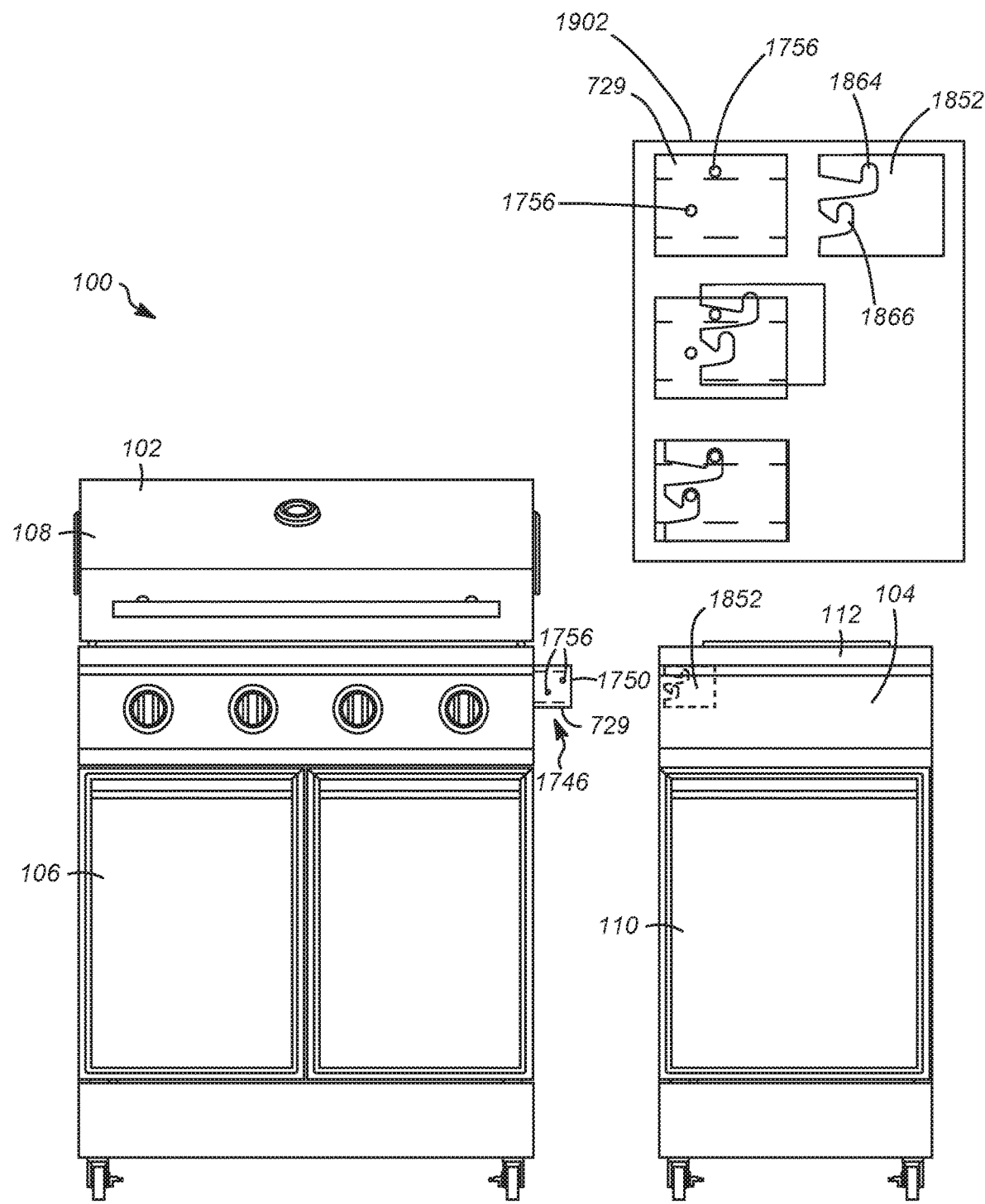
FIG. 19 is a front view of a grill system including a connection sequence drawings insert in accordance with various embodiments herein.

FIG. 19 shows a front view of a grill system 100, along with a connection sequence drawing insert 1902. Similar to the connection sequence drawing insert 1702, the connection sequence drawing insert 1902 shows a sequence of the male connection element 1750 connecting with the female connection element 1852. The connection sequence will now be described with respect to FIGS. 18-19. The female connection element 1852 can include two sloped surfaces 1860, 1862 configured for the projections 1756 to run along as the side assembly 104 is moved towards the grill assembly 102. The projections 1756 running along the sloped surfaces 1860, 1862 can raise or lift the side assembly 104 relative to the grill assembly 102. Once the projections 1756 have traveled past the end of the sloped surfaces 1860, 1862, the side assembly 104 can be lowered into a resting position, thereby resulting in the projections 1756 being disposed within the two recesses 1858, 1859 defined by the connection structure. The recesses 1858, 1859 can restrict the movement of the projections 1756, such that the side assembly 104 cannot be separated from the grill assembly 102 without first being lifted or raised to displace the projection 1756 from the recess 1858.

Connection between Top Cap and Side Cart

As mentioned above, in some embodiments, the top cap 112 can include one or more projections 1042, which can extend into one or more apertures defined by the side cart 110. The top cap 112 can further include a locking mechanism 1044. The locking mechanism 1044 can include a locking pin 2064. When the locking pin 2064 is in a retracted position (shown in the FIG. 20A), the top cap 112 is not locked to the side cart 110. When the locking pin 2064 is in the extended position (shown in FIG. 20B), the top cap 112 is locked to the side cart 110, such that the top cap 112 cannot be lifted off the side cart 110 without first unlocking the top cap 112 from the side cart 110. In the extended position, the locking pin 2064 can extend through a portion of the side cart 110, such as a portion that defines the aperture for the projection 1042. The locking pin 2064 can further extend into the projection 1042, in some embodiments. In some embodiments, the locking pin 2064 can be manually actuated or spring actuated.

Methods

Figure 21:
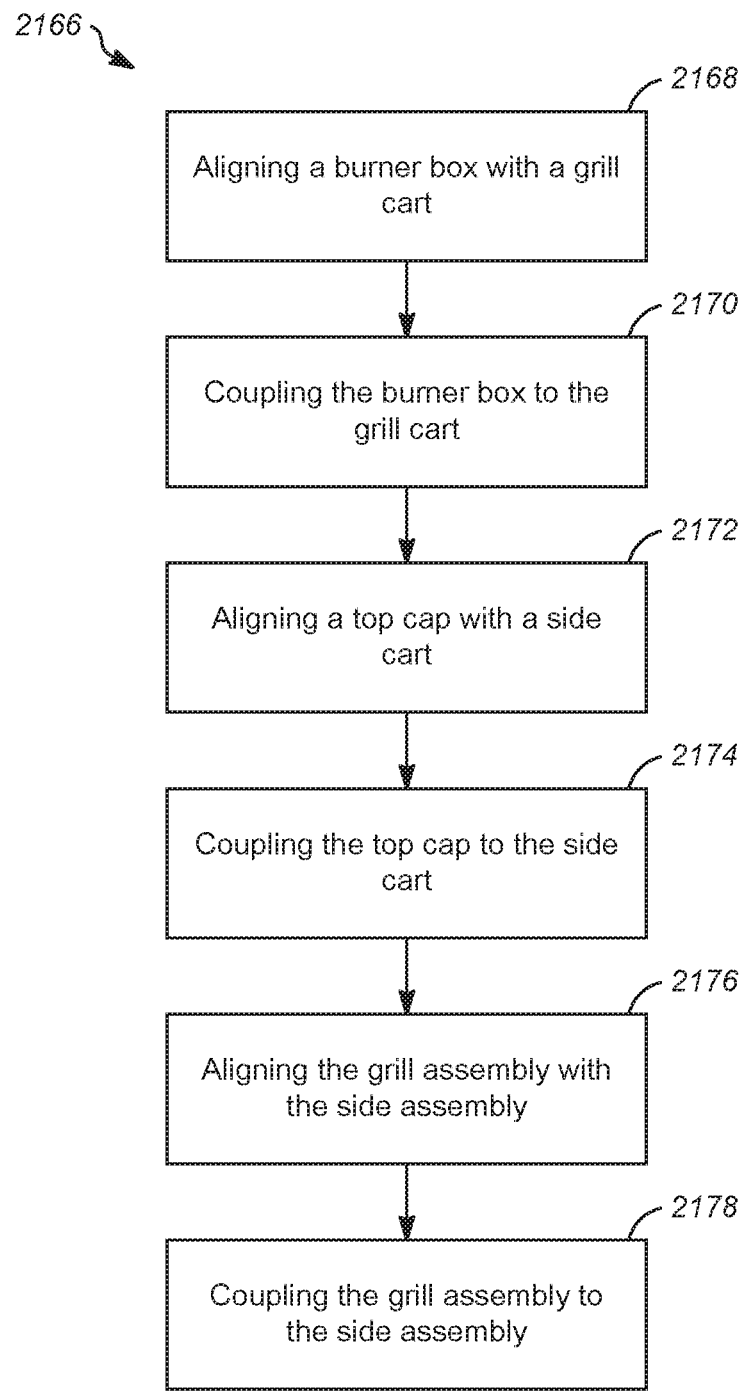
FIG. 21 is flow chart depicting a method in accordance with various embodiments herein.

FIG. 21 is flow chart depicting a method 2166 in accordance with various embodiments herein. The method 2166 can provide a method for assembling a grill system. In some embodiments, the method 2166 can include aligning a burner box with a grill cart 2168. The method 2166 can further include coupling the burner box to the grill cart 2170.

In some embodiments, the method 2166 can include aligning a top cap with a side cart 2172. The method 2166 can further include coupling the top cap to the side cart 2174. It should be understood that steps 2168 and 2170 related to forming the grill assembly can take place before or after steps 2172 and 2174 related to forming the side assembly.

In various embodiments, the method 2166 can further include aligning the grill assembly with the side assembly 2176. The method 2166 can further include coupling the grill assembly to the side assembly 2178.

Various embodiments of the method 2166 can further include aligning a second top cap with a second side cart and coupling the second top cap with the second side cart to form a second side assembly. The method 2166 can further include aligning and coupling the second side assembly to the grill assembly (on the opposite side from the first side assembly) or to the first side assembly (on the opposite side from the grill assembly).

In some embodiments, coupling the side assembly to the grill assembly 2178 includes inserting a portion of a first connection structure into a portion of a second connection structure. It will be understood that additional steps of inserting portions of connection structures into other portions of connection structures can be included in the method 2166 to account for all of the connections structures includes in the specific grill systems.

In some embodiments, coupling the side assembly to the grill assembly 2178 can include latching the toe kick panel of the grill assembly with a toe kick panel of the side assembly.

In some embodiments, the method 2166 can further include transitioning the first side cart from a folded position to an upright position prior to coupling the first side assembly to the grill assembly. In some embodiments, the method 2166 can further include transitioned the grill cart from a folded position to an upright position prior to coupling the burner box to the grill cart.

It should be noted that, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

As used herein, the recitation of numerical ranges by endpoints shall include all numbers subsumed within that range (e.g., 2 to 8 includes 2.1, 2.8, 5.3, 7, etc.).

The headings used herein are provided for consistency with suggestions under 37 CFR 1.77 or otherwise to provide organizational cues. These headings shall not be viewed to limit or characterize the invention(s) set out in any claims that may issue from this disclosure. As an example, although the headings refer to a "Field," such claims should not be limited by the language chosen under this heading to describe the so-called technical field. Further, a description of a technology in the "Background" is not an admission that technology is prior art to any invention(s) in this disclosure. Neither is the "Summary" to be considered as a characterization of the invention(s) set forth in issued claims.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

The invention claimed is:

1. A grill system, comprising:
a grill assembly comprising a grill cart and a burner box configured to couple to a top portion of the grill cart, the burner box comprising a first connection structure; and
a first side assembly comprising a first side cart and a first top cap configured to couple to a top portion of the first side cart, the first top cap comprising a second connection structure;
wherein the first connection structure and the second connection structure mate together to couple the grill assembly to the first side assembly;
wherein the first connection structure comprises a first bracket and a second bracket extending away from the burner box in a first direction from the same side of the burner box; wherein the second connection structure defines a first bracket aperture and a second bracket aperture, wherein the first bracket aperture is configured for a portion of the first bracket to fit within and the second bracket aperture is configured for a portion of the second bracket to fit within such that the first bracket and the second bracket extend within the first top cap when the first connection structure mates with the second connection structure.

2. The grill system of claim 1, wherein the burner box further comprises a third connection structure, wherein the third connection structure comprises a third bracket and a fourth bracket extending in a second direction, opposite from the first direction, from a side of the burner box that is opposite from the side in which the first and second projections extend from.

3. The grill system of claim 2, further comprising a second side assembly, the second side assembly comprising a second side cart and a second top cap;
wherein the second top cap comprises a fourth connection structure, wherein the fourth connection structure defines a third bracket aperture and a fourth bracket aperture, wherein the third bracket aperture is configured for a portion of the third bracket to fit within and the fourth bracket aperture is configured for a portion of the fourth bracket to fit within when the third connection structure mates with the fourth connection structure.

4. The grill system of claim 3, wherein the first side assembly is configured in a right-hand configuration such that the second connection structure is on a left portion of the first side assembly and the second side assembly is configured in a left-hand configuration such that the fourth connection structure is on a right portion of the second side assembly.

5. The grill system of claim 1, wherein the first bracket is at least 2 inches long and not more than 12 inches long, and the second bracket is at least 2 inches long and not more than 12 inches long.

6. The grill system of claim 1, wherein the first bracket is identical to the second bracket.

7. The grill system of claim 1, wherein the first connection structure is graspable.

8. The grill system of claim 1, wherein the first top cap includes a functional element selected from the group consisting of: a second burner box, an ice box, a smoker, an oven, a sink, a work surface, a warming drawer, a sous vide cooker, a high heat burner, a ceramic cooker, a portion of a pellet grill, pellet feeder, pellet hopper, a pellet grill, or a refrigerator.

9. The grill system of claim 1, further comprising a second side assembly, the second side assembly comprising a second side cart and a second top cap configured to couple to a top portion of the second side cart; wherein the second top cap comprising a fourth connection structure configured to mate with a third connection structure of the burner box.

10. The grill system of claim 9, wherein the first top cap comprises a first functional element selected from the group consisting of a second burner box, an ice box, a smoker, an oven, a sink, a work surface, a warming drawer, a sous vide cooker, a high heat burner, a ceramic cooker, a pellet grill, a portion of a pellet grill, a pellet hopper, a pellet feeder, or a refrigerator;
wherein the second top cap comprises a second functional element selected from the group consisting of a second burner box, an ice box, a smoker, an oven, a sink, a work surface, a warming drawer, a sous vide cooker, a high heat burner, a ceramic cooker, a pellet grill, a portion of a pellet grill, a pellet hopper, a pellet feeder, or a refrigerator.

11. The grill system of claim 10, wherein the first functional element is not equivalent to the second functional element.

12. The grill system of claim 1, wherein the first bracket comprises a first projection of the first bracket and the second bracket comprises a first projection of the second bracket.

13. The grill system of claim 12, wherein the first projection of the first bracket extends in a direction that is perpendicular to the first direction, and the first projection of the second bracket extends in a direction that is perpendicular to the first direction.

14. The grill system of claim 12, wherein the second connection structure comprises a first receiving bracket and a second receiving bracket, wherein the first receiving bracket and the second receiving bracket are disposed within the first top cap.

15. The grill system of claim 14, wherein the first projection of the first bracket extends in a direction that is perpendicular to the first direction, and the first projection of the second bracket extends in a direction that is perpendicular to the first direction, and
wherein the first receiving bracket defines a first receiving aperture of the first receiving bracket configured to receive the first projection of the first bracket and the second receiving bracket defines a first receiving aperture of the second receiving bracket configured to receive the first projection of the second bracket.

16. The grill system of claim 1, wherein the first bracket comprises a first projection of the first bracket and the second bracket comprises a first projection of the second bracket;
wherein the second connection structure comprises a first receiving bracket and a second receiving bracket, wherein the first receiving bracket and the second receiving bracket are disposed within the first top cap;
wherein the first receiving bracket defines a first receiving aperture of the first receiving bracket configured to receive the first projection of the first bracket and the second receiving bracket defines a first receiving aperture of the second receiving bracket configured to receive the first projection of the second bracket;
wherein the first receiving bracket comprises a sloped surface that defines a portion of the first receiving aperture of the first receiving bracket, wherein the sloped surface is configured to guide the first projection of the first bracket when the grill assembly is mated to the side assembly; and
wherein the second receiving bracket comprises a sloped surface that defines a portion of the first receiving aperture of the second receiving bracket, wherein the sloped surface of the second receiving bracket is configured to guide the first projection of the second bracket when the grill assembly is mated to the side assembly.

17. The grill system of claim 1, wherein the first top cap comprises one or more downward connection projections, and the first side cart defines one or more connection recesses, wherein the one or more connection recesses are configured to accept the one or more downward connection projections to couple the first top cap to the first side cart.

18. The grill system of claim 17, wherein the first top cap comprises a locking mechanism configured to secure the first top cap to the first side cart; and
wherein the locking mechanism comprises a locking pin that translates in a direction that is perpendicular to the one or more downward connection projections.

19. The grill system of claim 18, wherein the locking pin extends through a portion of the first side cart to secure the first top cap to the first side cart.

20. A grill system, comprising:
a grill assembly comprising a grill cart and a burner box configured to couple to a top portion of the grill cart, the burner box comprising a first connection structure; and
a first side assembly comprising a first side cart and a first top cap configured to couple to a top portion of the first side cart, the first top cap comprising a second connection structure, wherein the first side cart is configured to be transitioned between a folded state and an upright state;
wherein the first connection structure and the second connection structure mate together to couple the grill assembly to the first side assembly;
wherein the first connection structure comprises a first bracket and a second bracket extending away from the burner box in a first direction from the same side of the burner box; wherein the second connection structure defines a first bracket aperture and a second bracket aperture, wherein the first bracket aperture is configured for a portion of the first bracket to fit within and the second bracket aperture is configured for a portion of the second bracket to fit within such that the first bracket and the second bracket extend within the first top cap when the first connection structure mates with the second connection structure;
wherein the first bracket comprises a first projection of the first bracket and the second bracket comprises a first projection of the second bracket;
wherein the second connection structure comprises a first receiving bracket and a second receiving bracket, wherein the first receiving bracket and the second receiving bracket are disposed within the top first cap;

wherein the first receiving bracket defines a first receiving aperture of the first receiving bracket configured to receive the first projection of the first bracket and the second receiving bracket defines a first receiving aperture of the second receiving bracket configured to receive the first projection of the second bracket;

wherein the first receiving bracket comprises a sloped surface that defines a portion of the first receiving aperture of the first receiving bracket, wherein the sloped surface is configured to guide the first projection of the first bracket when the grill assembly is mated to the side assembly;

wherein the second receiving bracket comprises a sloped surface that defines a portion of the first receiving aperture of the second receiving bracket, wherein the sloped surface of the second receiving bracket is configured to guide the first projection of the second bracket when the grill assembly is mated to the side assembly;

wherein the first top cap comprises a first functional element selected from the group consisting of: a second burner box, an ice box, a smoker, an oven, a sink a work surface, a warming drawer, a sous vide cooker, a high heat burner, a ceramic cooker, a pellet grill, a portion of a pellet grill, a pellet hopper, a pellet feeder, or a refrigerator.

21. The grill system of claim 20, further comprising:

a second side assembly comprising a second side cart and a second top cap configured to couple to a top portion of the second side cart, the second top cap comprising a fourth connection structure, wherein the second side cart is configured to be transitioned between a folded state and an upright state;

wherein the burner box further comprises a third connection structure;

wherein the second top cap comprises a second functional element selected from the group consisting of: a second burner box, an ice box, a smoker, an oven, a sink a work surface, a warming drawer, a sous vide cooker, a high heat burner, a ceramic cooker, a pellet grill, a portion of a pellet grill, a pellet hopper, a pellet feeder, or a refrigerator.

22. A grill system, comprising:

a grill assembly comprising a grill cart and a burner box configured to couple to a top portion of the grill cart, the burner box comprising a first connection structure; and a first side assembly comprising a first side cart and a first top cap configured to couple to a top portion of the first side cart, the first top cap comprising a second connection structure;

wherein the first connection structure and the second connection structure mate together to couple the grill assembly to the first side assembly;

wherein the first connection structure comprises a first bracket and a second bracket extending away from the burner box in a first direction from the same side of the burner box; wherein the second connection structure defines a first bracket aperture and a second bracket aperture, wherein the first bracket aperture is configured for a portion of the first bracket to fit within and the second bracket aperture is configured for a portion of the second bracket to fit within such that the first bracket and the second bracket extend within the first top cap when the first connection structure mates with the second connection structure;

wherein the first bracket comprises a first projection of the first bracket and the second bracket comprises a first projection of the second bracket;

wherein the second connection structure comprises a first receiving bracket and a second receiving bracket, wherein the first receiving bracket and the second receiving bracket are disposed within the first top cap;

wherein the first receiving bracket defines a first receiving aperture of the first receiving bracket configured to receive the first projection of the first bracket and the second receiving bracket defines a first receiving aperture of the second receiving bracket configured to receive the first projection of the second bracket;

wherein the first receiving bracket comprises a sloped surface that defines a portion of the first receiving aperture of the first receiving bracket, wherein the sloped surface is configured to guide the first projection of the first bracket when the grill assembly is mated to the side assembly;

wherein the second receiving bracket comprises a sloped surface that defines a portion of the first receiving aperture of the second receiving bracket, wherein the sloped surface of the second receiving bracket is configured to guide the first projection of the second bracket when the grill assembly is mated to the side assembly;

wherein the first top cap comprises one or more downward connection projections, and the first side cart defines one or more connection recesses, wherein the one or more connection recesses are configured to accept the one or more downward connection projections to couple the first top cap to the first side cart;

wherein the first top cap comprises a locking mechanism configured to secure the first top cap to the first side cart; and wherein the locking mechanism comprises a locking pin that translates in a direction that is perpendicular to the one or more downward connection projections.

* * * * *